(12) United States Patent
Greenlee

(10) Patent No.: US 10,395,630 B1
(45) Date of Patent: Aug. 27, 2019

(54) TOUCHLESS KNOB AND METHOD OF USE

(71) Applicant: Jonathan Greenlee, Saint Paul, MN (US)

(72) Inventor: Jonathan Greenlee, Saint Paul, MN (US)

( * ) Notice: Subject to any disclaimer, the term of this patent is extended or adjusted under 35 U.S.C. 154(b) by 0 days.

(21) Appl. No.: 15/905,814

(22) Filed: Feb. 26, 2018

Related U.S. Application Data

(60) Provisional application No. 62/463,726, filed on Feb. 27, 2017.

(51) Int. Cl.
*G10H 5/00* (2006.01)
*G10H 1/18* (2006.01)
*G06F 3/044* (2006.01)

(52) U.S. Cl.
CPC ............. *G10H 1/18* (2013.01); *G10H 5/002* (2013.01); *G06F 3/044* (2013.01); *G06F 2203/04108* (2013.01); *G10H 2220/401* (2013.01); *G10H 2220/405* (2013.01); *G10H 2230/051* (2013.01)

(58) Field of Classification Search
CPC .... G10H 1/18; G10H 5/002; G10H 2220/401; G10H 2220/405; G10H 2230/051; G06F 3/044; G06F 2203/04108
USPC ........................................................ 84/672
See application file for complete search history.

(56) References Cited

U.S. PATENT DOCUMENTS

| | | | |
|---|---|---|---|
| 1,661,058 A | 2/1928 | Ssergejewitsch | |
| 4,438,674 A * | 3/1984 | Lawson | G10H 1/0551 84/678 |
| 5,214,615 A * | 5/1993 | Bauer | G06F 3/011 367/128 |
| 5,998,727 A * | 12/1999 | Toba | G10H 1/00 341/31 |
| 6,137,042 A * | 10/2000 | Kurtzberg | G09B 15/00 84/477 R |
| 6,150,600 A * | 11/2000 | Buchla | G10H 1/0555 84/688 |
| 6,388,183 B1 * | 5/2002 | Leh | G10H 1/0008 84/645 |
| 7,939,742 B2 * | 5/2011 | Glaser | G10H 1/0555 84/600 |
| 7,982,124 B1 * | 7/2011 | Landis | G10H 3/18 84/727 |
| 8,492,640 B2 * | 7/2013 | Chang | G10H 1/0083 84/723 |
| 8,618,405 B2 * | 12/2013 | Tansley | G10H 1/0066 84/645 |
| 8,816,873 B2 * | 8/2014 | Bisset | A47C 7/022 340/573.1 |
| 8,872,014 B2 | 10/2014 | Sandler | |
| 9,552,069 B2 * | 1/2017 | Gilad-Bachrach | G06F 3/017 |
| 2007/0000374 A1 * | 1/2007 | Clark | G10H 1/0008 84/724 |
| 2007/0008726 A1 * | 1/2007 | Brown | H05B 33/0857 362/276 |
| 2011/0077757 A1 * | 3/2011 | Chang | G06F 3/0354 700/94 |

(Continued)

OTHER PUBLICATIONS

Alesis Studio Electronics, AirFX Manual. Published in 2000, pp. 11-22.

*Primary Examiner* — Jeffrey Donels

(57) ABSTRACT

A signal processing system, machine and method of use to dynamically change the parameters of an audio-visual signal processing circuit without making physical contact.

18 Claims, 27 Drawing Sheets

(56) References Cited

U.S. PATENT DOCUMENTS

| | | | |
|---|---|---|---|
| 2011/0118871 A1* | 5/2011 | Tsujino | B25J 11/00 |
| | | | 700/245 |
| 2012/0272813 A1* | 11/2012 | Moon | G10H 1/0553 |
| | | | 84/645 |
| 2014/0238221 A1* | 8/2014 | Roberts | G10H 1/0553 |
| | | | 84/724 |
| 2016/0180701 A1* | 6/2016 | Golliher | G06F 3/017 |
| | | | 340/12.5 |
| 2017/0090640 A1 | 3/2017 | Roberts | |
| 2018/0046253 A1* | 2/2018 | Ho | G06F 3/017 |

* cited by examiner

TOUCHLESS KNOB AND METHOD OF USE

RELATED APPLICATIONS

Priority claim 62/463,726 filed Feb. 27, 2017 included by reference.

BACKGROUND—PRIOR ART

Signals, such as audio and video, are an essential component of the creative process in many industries, such as film, video game development, and performing arts. Professionals and hobbyists in these disciplines are always looking for new tools and methods to manipulate signals. Today, many different signal processing circuits and manipulation techniques are in use for the purpose of creative expression.

One example is audio processing circuits, which are common in studio and live performance applications. Many are marketed as effects processors. Some of these effects processors are configured for use on the ground, and are known as effects pedals, stomp boxes, or guitar pedals. These effects processors are widely used by guitarists, keyboard players, singers, and other instrumentalists. Such devices typically offer signal processing parameters that can be adjusted by the user. These are frequently presented as knobs for the users to turn and adjust to their liking.

SUMMARY OF THE INVENTION

One exciting application of an effects pedal is to turn the parameter knobs while playing. For example, a performance technique sometimes used by electric guitar players is to adjust a knob on an effects pedal while playing a guitar connected to the effects pedal. Turning the knob adjusts the value of the parameter associated with the knob within the effects pedal, such as gain or delay time. This action can create interesting and sometimes wild effects upon the signal passing through the pedal. However, this is generally only possible when a hand is dedicated to the task of turning the knob. To accomplish this effect, a guitarist typically stoops down to the ground during a performance and turns a knob on a connected effects pedal. Unfortunately, using a hand to turn a knob generally forces the guitarist to play the guitar with only one hand. This significantly limits their ability to play their instrument.

Many effects processors use conventional potentiometers and components, and some use programmatically controlled components such as digital potentiometers and varactors. However, these programmatically controlled components are restricted to preprogrammed fixed behaviors such as a periodic tremolo or an envelope filter. Although these use cases are touchless, they do not offer the same expressive, interactive control of a signal processing parameter that a hand-turned knob offers.

This disclosure provides a solution to these issues. Accordingly, several advantages of one or more aspects are as follows: to provide touchless knobs and a method of use, that can be used to dynamically vary the value of a programmatically controlled component placed within an audio-visual signal processing circuit to enhance live performance abilities, that provide a means to vary the preset parameter of a programmatically controlled component with a method that incorporates expressive motion without physical contact, that expand the performance options available to a user of a signal processing circuit by a means comprising touchless expressive motion of the human body without monopolizing the use of a hand, foot, specific limb or appendage. Other advantages of one or more aspects will be apparent from a consideration of the drawings and ensuing description.

DETAILED DESCRIPTION—FIRST EXAMPLE—FIGS. 1, 2, 26, 28

Figure 1:
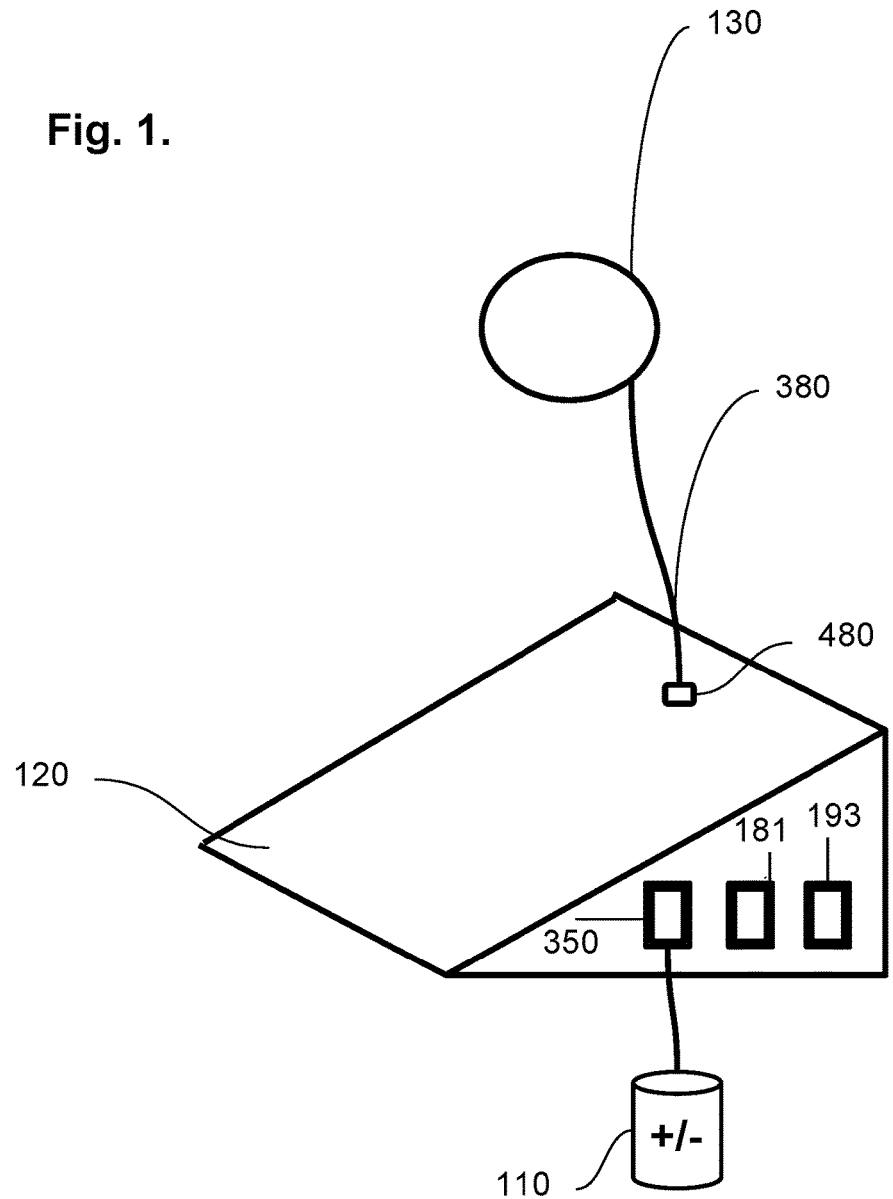
FIG. 1 shows a perspective view of various aspects of a touchless knob in accordance with the disclosure.
Figure 2:
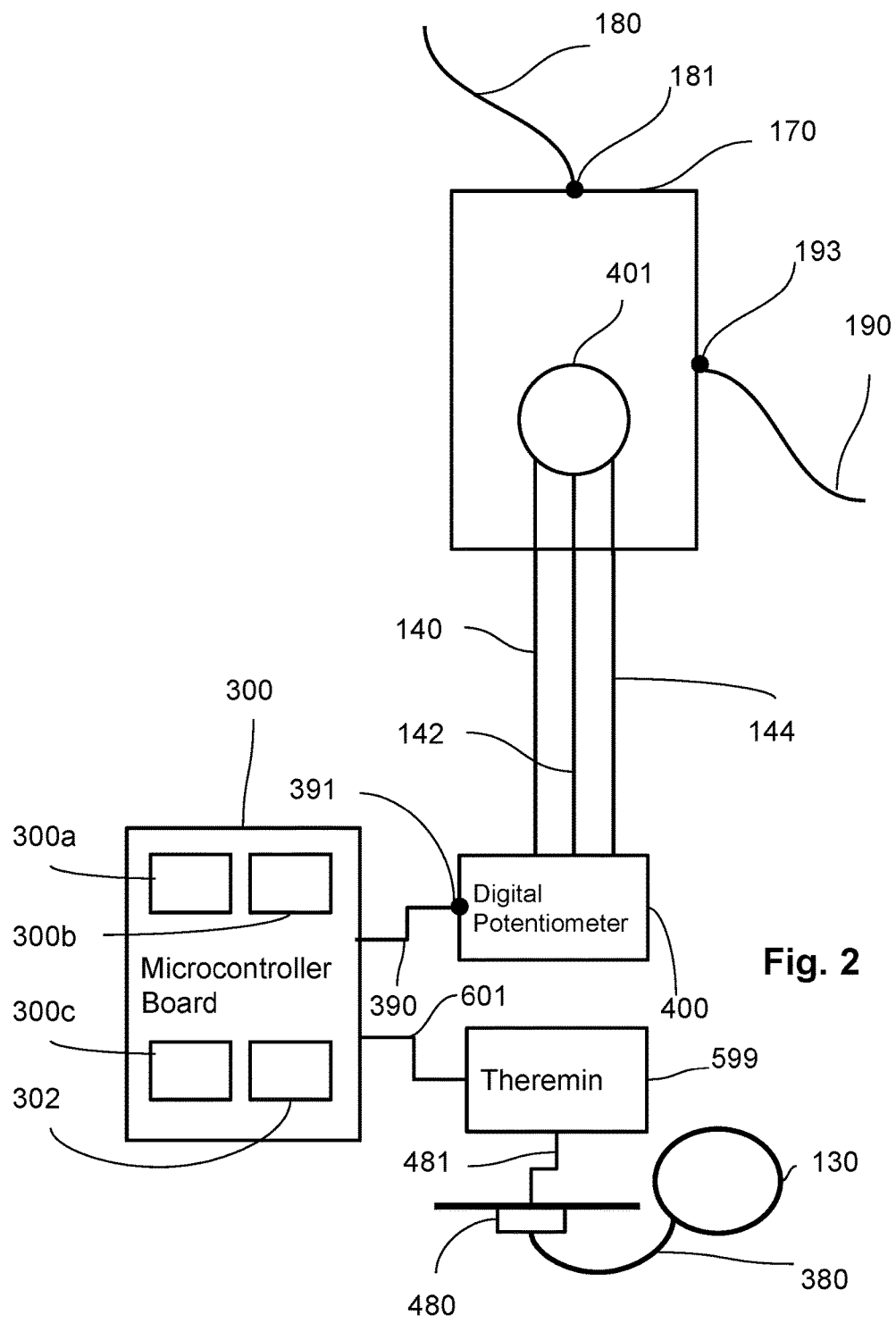
FIG. 2 shows a diagram of various aspects of the touchless knob shown in FIG. 1.
Figure 3:
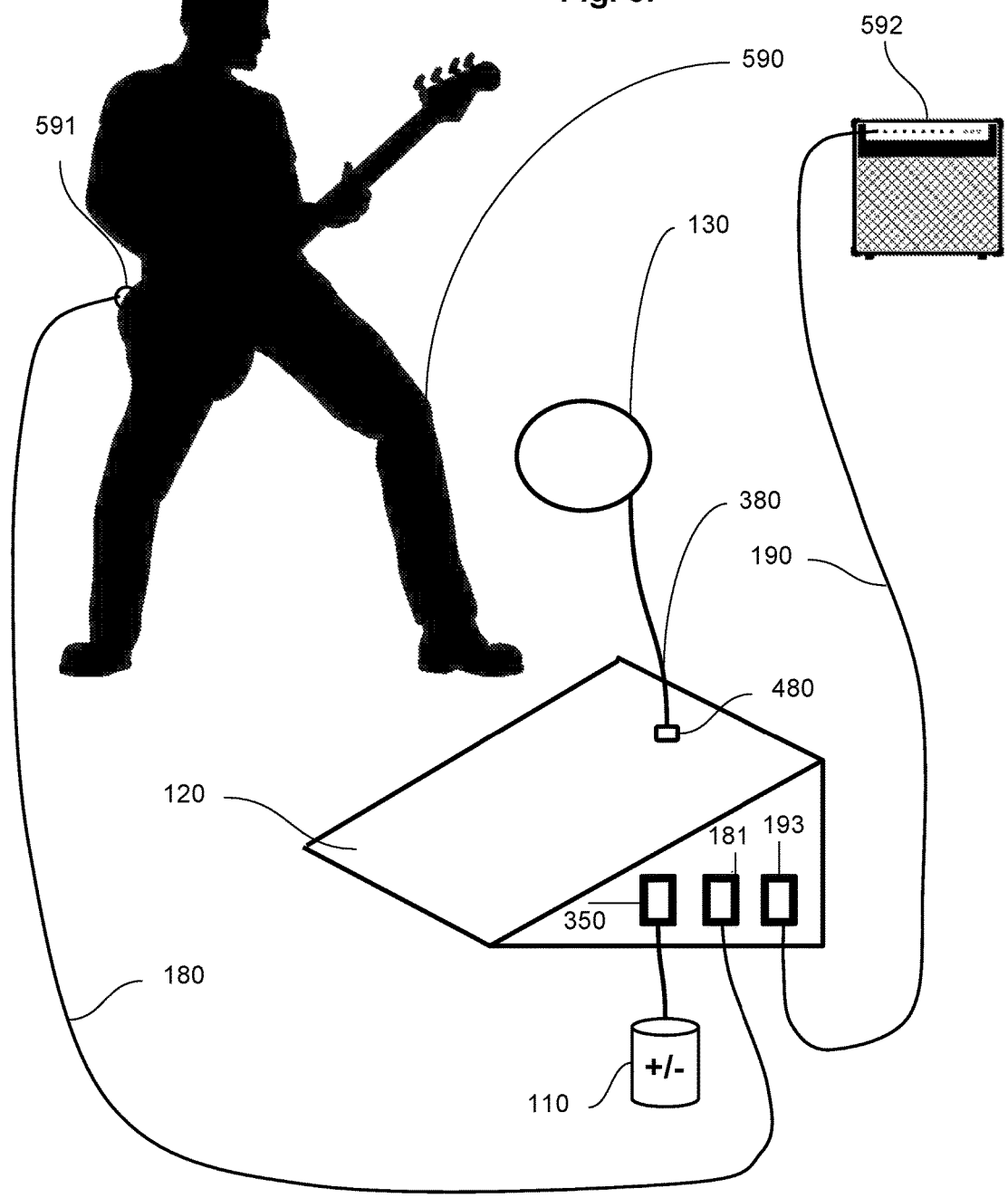
FIG. 3 shows a perspective view of various aspects of a touchless knob shown in FIG. 1 and a method of use in accordance with the disclosure.

One example of the touchless knob is illustrated in FIGS. 1 and 2. The touchless knob is a signal processing system, comprising a touchless sensor 599, a microcontroller board 300, a programmatically controlled component 400, and an audio-visual signal processing circuit 170.

There is shown a primary power supply 110 which is typically a 5-18V DC power supply such as an internal power supply, a battery, or a "wall wart" AC power adapter. This is connected to the primary power supply input connection 350.

There is shown an antenna 130. The antenna 130 can be a conductive material in almost any shape, but a satisfactory choice would be a round or square metal plate approximately 6"-12" in diameter. The antenna 130 is mounted on an adjustable wired antenna stand 380. A satisfactory choice for an adjustable wired antenna stand 380 would be a gooseneck stand, commonly used in podium microphones, with an added conductive wire used to electrically connect the antenna 130 through the antenna enclosure connection 480 and to the internal antenna connection 481 which is connected to a touchless sensor 599. The adjustable wired antenna stand 380 connects to an antenna enclosure connection 480 which is mounted upon an enclosure 120, all of which together provide structural support for the antenna 130.

The output of the touchless sensor 599 is a touchless sensor output signal 601. In the example depicted here, the touchless sensor is a Theremin 599. Other types of touchless sensors are possible. Non-limiting examples of touchless sensors include Theremins, capacitive sensors, optical distance sensors, and ultrasonic distance sensors. The Theremin 599 is advantageous as a touchless sensor in that the touchless sensor output signal 601 from a Theremin 599 offers finer or smoother resolution and faster response times when compared to the touchless sensor output signal 601 received from some comparable distance sensors, such as some ultrasonic distance sensors. In the example depicted here, the touchless sensor output signal is a monophonic audio signal 601. Other types of touchless sensor output signals are possible.

In this embodiment, the Theremin 599 is a partial implementation of the electronic instrument, the Theremin, specifically the portion of the circuit therein that outputs a monophonic musical tone in response to the position of a human body or limb relative to an antenna. Several commercial kits are available which would be satisfactory as a choice for the Theremin 599 such as a kit offered by Harrison Instruments. It would also be satisfactory to construct a Theremin 599 from scratch using one of the many schematics available on the internet using parts sourced from an electronics distributor such as Digikey or Mouser. Extensive information on Theremin 599 construction and calibration is publicly available.

Figure 26:
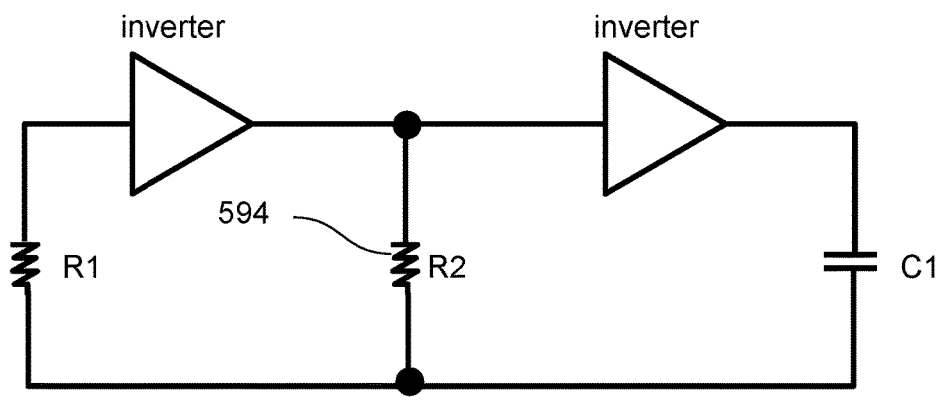
FIG. 26 shows a diagram of the first oscillator of a Theremin in accordance with the disclosure.
Figure 28:
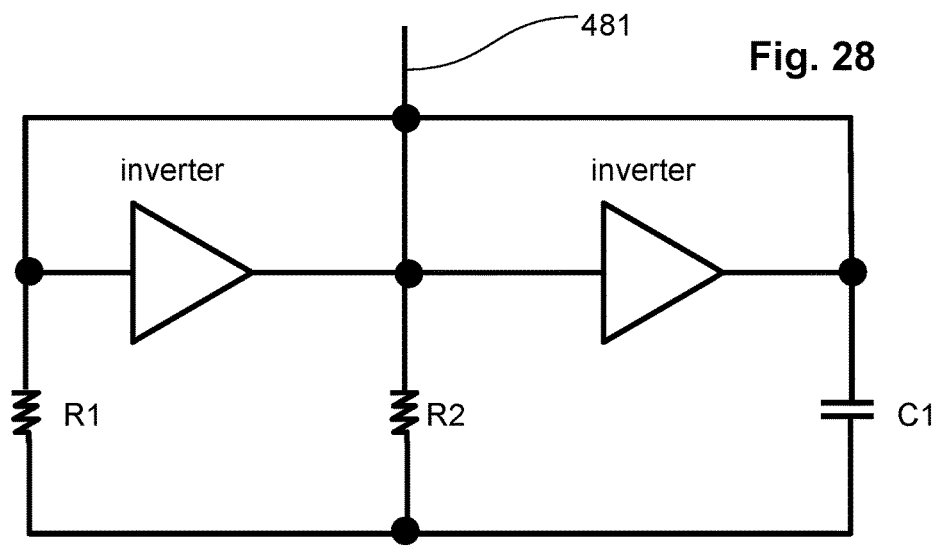
FIG. 28 shows a diagram of the second oscillator of a Theremin in accordance with the disclosure.

In this embodiment, the Theremin 599 comprises a first oscillator and a second oscillator each of which are RC oscillators and are approximately tuned according to the equation $$\text{frequency} = 1/(2.2 * C1 * R2)$$

where C1 is the value of a capacitive element in the oscillator circuit and R2 is the value of a resistive element in the oscillator circuit. FIG. 26 shows a simple RC oscillator circuit that would be satisfactory as the first oscillator in the Theremin 599, although many other oscillator circuits would be satisfactory. In this embodiment, a potentiometer 594 is used for the R2 resistive element in the first oscillator so that the frequency can be easily adjusted, although a single fixed, a set of fixed value resistors, or a combination of these would also be satisfactory. FIG. 28 shows a simple RC oscillator circuit that would be satisfactory as the second oscillator in the Theremin 599, however many other oscillator circuits would be satisfactory. The second oscillator shown in FIG. 28 has an electrical connection to the internal antenna connection 481. These oscillator circuits are approximate examples of the "less than perfect oscillator" shown in the Fairchild Semiconductor Application Note 118 October 1974, included by reference, https://web.archive.org/web/20170209183114/https://www.fairchildsemi-.com/application-notes/AN/AN-118.pdf The monophonic audio signal 601 approximately falls within a first predetermined range of values; a range that is determined by the calibration of the Theremin 599. The monophonic audio signal 601 is connected to a microcontroller board 300.

With continued reference to FIG. 2, the touchless knob may also include a microcontroller board 300. The microcontroller board 300 is schematically shown as including a processor 300a and a non-transient storage medium or memory 300b, such as RAM, flash drive or a hard drive. Memory 300b is for storing executable code, the operating parameters, and the input from the operator user interface 302 while processor 300a is for executing the code. The electronic controller is also shown as including a transmitting/receiving port 300c, such as an Ethernet port for two-way communication with a WAN/LAN related to an automation system. A user interface 302 may be provided to activate and deactivate the system, allow a user to manipulate certain settings or inputs to the microcontroller board 300, and to view information about the system operation.

The microcontroller board 300 typically includes at least some form of memory 300b. Examples of memory 300b include computer readable media. Computer readable media includes any available media that can be accessed by the processor 300a. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 300a.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The microcontroller board 300 is also shown as having a number of inputs/outputs that may be used for implementing the below described methods A common commercially available option and a satisfactory choice for the microcontroller board 300 in this embodiment is a Teensy 3.2, though other choices are possible. The schematic for the Teensy 3.2 is available in the Teensy Reference Schematic https://web.archive.org/web/20170806054719/https://www.pjrc.com/teensy/schematic.html which is incorporated by reference.

In this embodiment, the monophonic output signal 601 has an approximate peak voltage of 2.5V and a +5V DC offset is placed upon the monophonic audio signal 601. The +5V DC offset constrains the signal approximately to a 0-5V range to meet the digital logic input tolerances for the microcontroller board 300. However, it would also be satisfactory to use a different DC offset or a DC offset of zero volts depending on the choice of microcontroller board 300.

Figure 22:
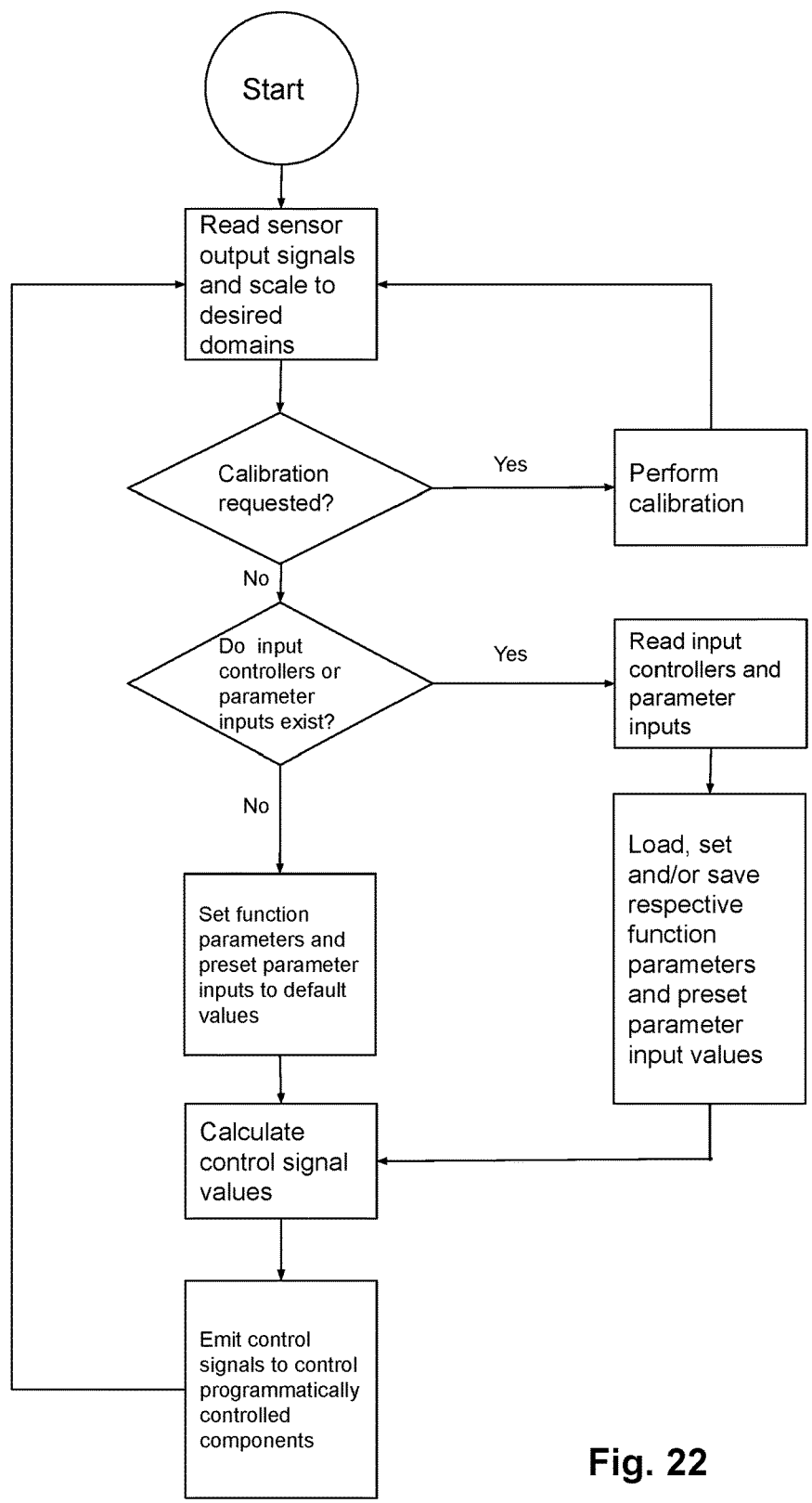
FIG. 22 shows a software flow diagram in accordance with the disclosure.

A software flow chart of the control algorithm programmed into the microcontroller board 300 is shown in FIG. 22.

The antenna 130, connected to the adjustable wired antenna stand 380, and the antenna enclosure connection 480 enables the positioning of the antenna 130 in an advantageous position for the user. The adjustable wired antenna stand 380 connects to the internal antenna connection 481 and on to the Theremin 599.

The microcontroller board 300 receives the monophonic audio signal 601 which falls within a first predetermined range of output values, a low and high frequency limit determined by the calibration of the Theremin 599. The microcontroller board 300 detects the frequency of the monophonic audio signal 601 using a frequency detection algorithm. A satisfactory frequency detection algorithm is available in the FreqMeasure library by Paul Stoffregen, although other software or hardware algorithms would also be satisfactory. In this embodiment a satisfactory first predetermined range of output values would be approximately 200 hz to 1600 hz, although other ranges are also satisfactory.

The microcontroller board 300 determines a scaling factor by calculating the ratio of (detected frequency−low frequency limit)/(high frequency limit−low frequency limit). When the detected frequency is 500 Hz, this scaling value is approximately (500−200)/(1600−200)=0.21429. This scaling factor is then used to obtain an equivalent value in another numeric range by multiplying the scaling factor against the maximum value of the desired zero-based range. Therefore, an equivalent scaled value in the zero-based range 0 to 65535 would be 14,043, and an equivalent scaled value in the zero-based range 0 to 1024 would be 219. In this way, the microcontroller board 300 derives a modified parameter value which is used as a control instruction for the control signal 390 from the frequency detected in the monophonic audio signal 601.

The microcontroller board 300 then emits this control signal 390 to the control signal input 391 of the programmatically controlled component 400. In the example depicted here, the audio-visual signal processing circuit is a volume circuit 170. Other audio-visual signal processing circuits are possible. By use of the term "audio-visual signal processing circuit" it is meant to include any signal processing circuit having audio only capabilities, visual only capabilities, and/or both audio and visual capabilities. Non-limiting examples of audio-visual signal processing circuits include audio effects pedals, audio expression pedals, wah-wah pedals, volume pedals, analog television effects, luminance processors, chrominance processors, hue and saturation processors.

The heart of the volume circuit 170 is the programmatically controlled component 400. In the example depicted here, the programmatically controlled component is a digital potentiometer 400, and the control signal 390 is a wiper control signal 390. Other programmatically controlled components are possible. Non-limiting examples of programmatically controlled components include digital potentiometers, variable capacitors, variable inductors, and digital rheostats. Other control signals are also possible and will be dictated by the selection of programmatically controlled component. The higher the frequency of the monophonic audio signal 601 detected by the microcontroller board 300, the higher the calculated value of the control instruction used to configure the first wiper leg 142 of the digital potentiometer 400, thereby setting the first parameter 401 of the volume circuit 170 from a current parameter value to a modified parameter value.

In this embodiment, the control instruction has a range of values of 0 to 1024, or 10-bit resolution to meet the requirements of the chosen digital potentiometer 400, although a different bit resolution or another value range is satisfactory.

The digital potentiometer 400 receives this control instruction as a wiper control signal 390 at the control signal input 391. The legs of the digital potentiometer 400 are connected to the volume circuit 170 at the circuit connection points corresponding to the legs of an equivalent potentiometer, whereby the digital potentiometer 400 operates equivalently, but is controllable by way of a wiper control signal 390. This allows for advantageous hands free manipulation of a first parameter 401 from a current value to a modified parameter value. Modifying the parameter value may also be accomplished by using the microcontroller board 300 to load or save preset parameter values for the first parameter 401. A digital potentiometer 400 controls the first parameter 401 wherein the first low leg 140, the first wiper leg 142, and the first high leg 144 are each connected to their respective circuit connection points of the first parameter 401 within the volume circuit 170.

In this embodiment, a satisfactory solution for the wiper control signal 390 is a SPI signal, also known as Serial Peripheral Interface protocol. A plurality of other communication protocols including but not limited to I2C (Inter-integrated circuit) would also be satisfactory and may further be dictated by the requirements of the chosen programmatically controlled component.

The microcontroller board 300 emits a wiper control signal 390 which conveys the control instruction, and upon receipt at the control signal input 391, the digital potentiometer 400 increases or decreases the wiper position value in response, which modifies the parameter value of the first parameter 401 of the volume circuit 170. It is advantageous that a musician can manipulate the volume circuit 170 without touching it.

The signal processing system is shown having an input signal connection 181, which receives an unprocessed input signal 180. The unprocessed input signal 180 is processed by the volume circuit 170 and the result is a processed output signal 190 which is output to an output signal connection 193.

OPERATION—FIGS. 2, 3

First, a primary power supply 110 which is typically a 5-18V DC power supply such as an internal power supply, a battery, or a "wall wart" AC power adapter is connected to the primary power supply input connection 350.

Next, the signal path is connected. In this embodiment, an audio-visual input device 591 emits an unprocessed input signal 180 which then connects to an input signal connection 181 of the audio-visual signal processing circuit 170. By use of the term "audio-visual input device" it is meant to include any input device having only audio only capabilities, visual only capabilities, and/or both audio and visual capabilities. Non-limiting examples of audio-visual input devices include microphones, electric guitars, synthesizers, and digital audio workstations.

In this example, the audio-visual input device is an electric guitar 591. In this example the audio-visual signal processing circuit is a volume circuit 170.

The signal emerges in a modified state at an output signal connection 193 as a processed output signal 190 which is connected to an audio-visual output device 592. By use of the term "audio-visual output device" it is meant to include any output or capture device having audio only capabilities, visual only capabilities, and/or both audio and visual capabilities. Non-limiting examples of audio-visual output devices include a speaker, a guitar amplifier, a television or computer monitor, and a video projector. Non-limiting examples of audio-visual capture devices include a magnetic tape recorder, a digital audio workstation, and a video camera. In this example, the audio-visual output device is a guitar amplifier 592.

Next, the Theremin 599 is calibrated. The Theremin 599 is a musical instrument that can drift out of tune over time, and therefore must be regularly calibrated. There are different ways to calibrate a Theremin 599, many of which are satisfactory.

FIG. 26 shows the first oscillator. In this embodiment, the first oscillator is tuned by the human 590 manipulating a potentiometer 594 which in turn modifies the value of R2 in the oscillator circuit. The first oscillator frequency is tuned such that when it is combined with the second oscillator frequency a beat frequency within the range of human hearing results. The frequency of the second oscillator is similarly determined by the values of R2 and C1 but is furthermore variably tuned by the physical interaction between the human 590 and the antenna 130; as the antenna 130, which is electrically connected to the internal antenna connection 481, acts as a variable capacitor within the RC oscillator circuit. This beat frequency is output from the Theremin 599 as a monophonic audio signal 601.

In the quiescent state of the Theremin 599, the human 590 is approximately positioned at the desired maximum distance from the antenna 130. In this embodiment, the Theremin 599 is tuned such that the quiescent beat frequency is approximately 200 Hz to 3000 Hz and such that the beat frequency increases as the human 590 approaches the antenna 130.

Next, the human 590 positions themselves in close proximity to the antenna 130 and then moves toward and then away from the antenna 130 while generating and emitting a signal from the electric guitar 591. Although positioning any body part in close proximity to the antenna 130 would be satisfactory, selecting a knee offers the human 590 a satisfactory option to continue using both hands to operate, for example, a musical instrument. In this embodiment, the use of a knee allows the human 590 to continue to use both hands to operate the electric guitar 591.

The antenna 130 connects to the Theremin 599, influencing the frequency output by the second, variable oscillator therein. Changes in the distance between the human 590 and the antenna 130 cause a minute change in capacitance which in turn affects the second oscillator which, when mixed with the output of the first oscillator, produces a beat frequency which is output from the Theremin 599 as a monophonic audio signal 601.

Following this, when the knee is brought increasingly close to the antenna, the frequency produced by the properly calibrated Theremin 599 increases. When this frequency increases, the microcontroller board 300 detects this change, and instructs the wiper control signal 390 to approximately increase, thereby increasing the wiper position of the digital potentiometer 400, setting the value of the first parameter 401 of the volume circuit 170 from a current parameter value to a modified parameter value. Next, as the distance between the antenna 130 and the human 590 increases, the frequency produced by the Theremin 599 decreases, which in turn causes the microcontroller board 300 to detect a lower frequency, and subsequently compute a lower value for the control instruction used in the wiper control signal 390, which in turn sets the wiper of the digital potentiometer 400 to a lower value, thereby setting the value of the first parameter 401 of the volume circuit 170 from a current parameter value to a modified parameter value. In this embodiment, changes in the first parameter 401 of the volume circuit 170 cause a change in amplitude of the processed output signal 190 which is the desired behavior of an volume circuit.

The rate at which this wiper control signal 390 changes is strongly affected by the instantaneous velocity of the human 590 in relation to the antenna 130. This instantaneous velocity can be controlled in a highly expressive way because the human body allows for very fine motor movements, ultimately allowing for subtle or dramatic effects in the processed output signal 190. These results indicate an advantageous new signal processing system with applications for performers offering minimal disruption to existing performance technique.

FIGS. 4,5—DESCRIPTION OF SECOND EXAMPLE

Figure 4:
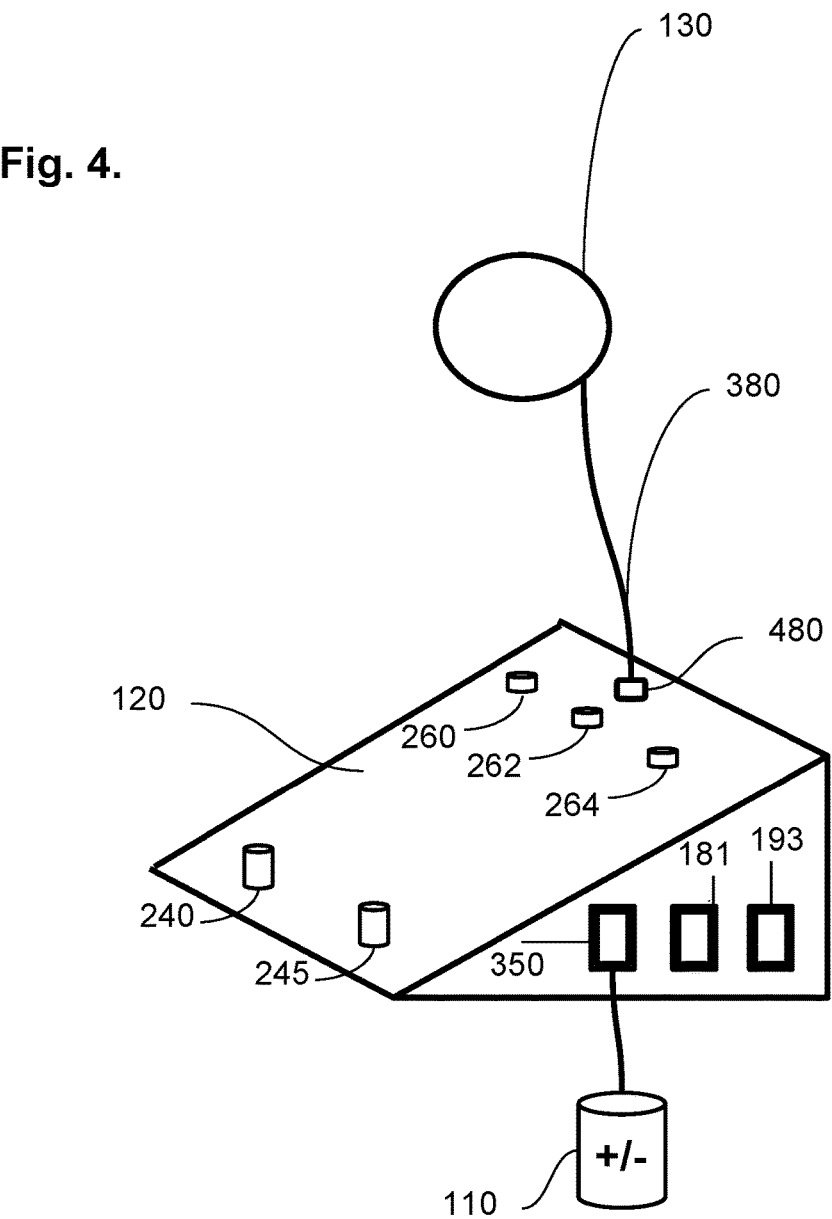
FIG. 4 shows a perspective view of various aspects of a second example of a touchless knob in accordance with the disclosure.
Figure 5:
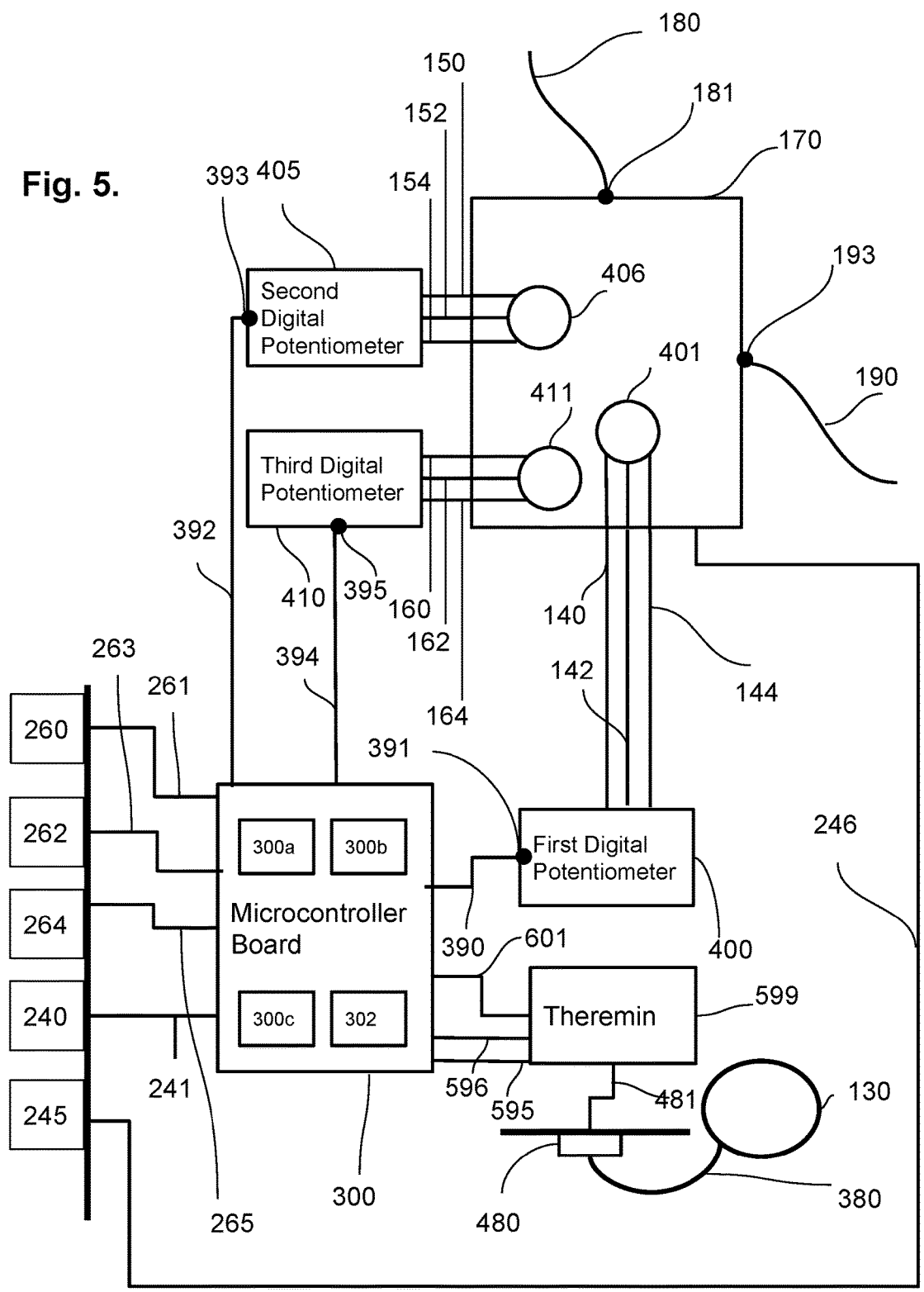
FIG. 5 shows a diagram of various aspects of the touchless knob shown in FIG. 4 in accordance with the disclosure.
Figure 6:
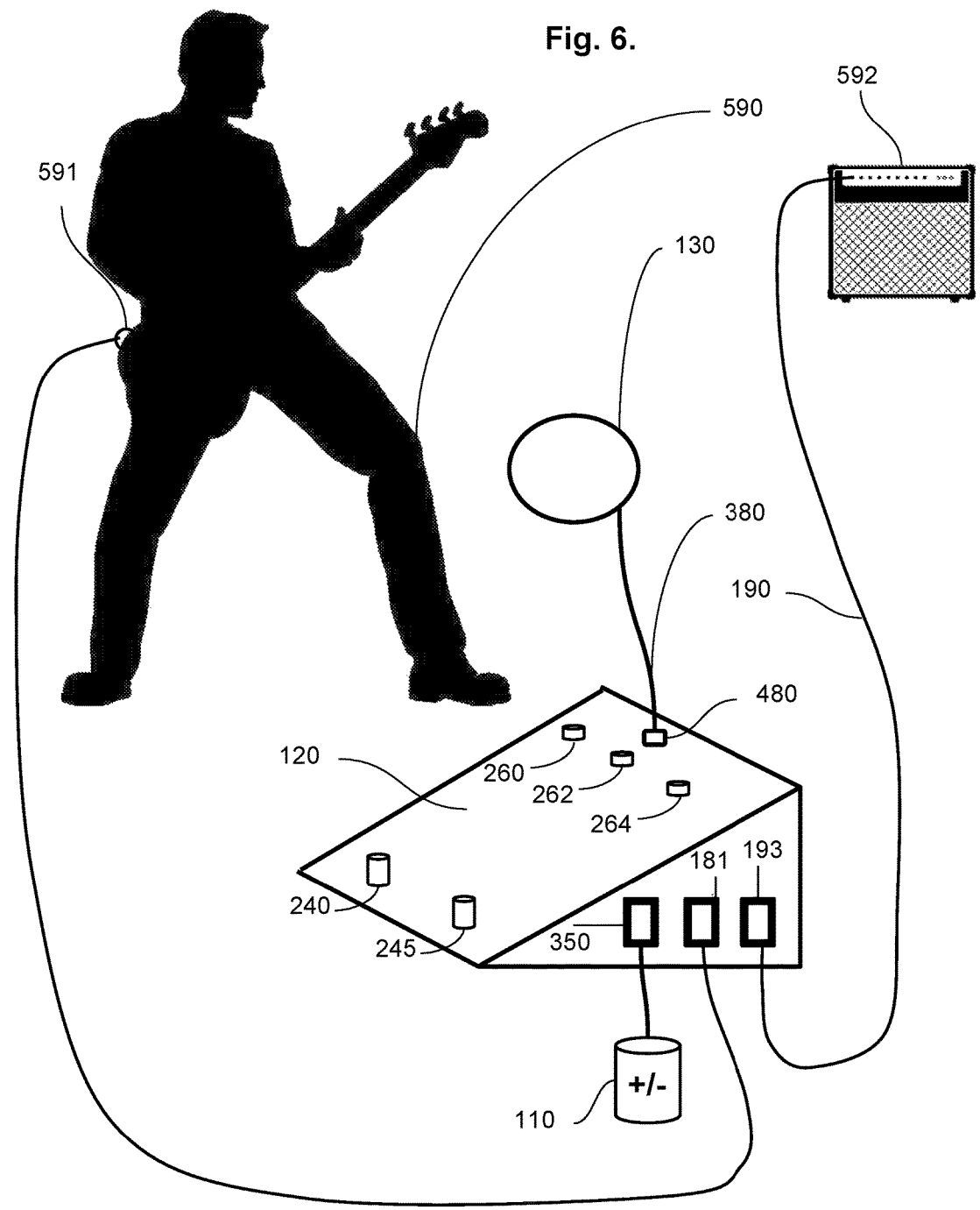
FIG. 6 shows a perspective view of various aspects of the touchless knob shown in FIG. 4 and a method of use in accordance with the disclosure.

A second example of the touchless knob is illustrated in FIG. 4 (top view) and FIG. 5 (internal diagram). In the example depicted here, the signal processing circuit 170 is a delay effect 170 which features three user configurable parameters, a first parameter 401 which is delay, a second parameter 406 which is mix, and a third parameter 411 which is repeat. Many other signal processing circuits would be equivalent and satisfactory. The delay, mix, and repeat parameters are traditionally controlled by potentiometers. In the example described here, those potentiometers are each replaced with a programmatically controlled component connected to a microcontroller board 300 from which a control signal is received. In the example depicted here, the programmatically controlled component 400 is a first digital potentiometer 400, the second programmatically controlled component 405 is a second digital potentiometer 405, and the third programmatically controlled component 410 is a third digital potentiometer 410.

To aid in the manipulation of these three control signals, three preset parameter inputs are mounted on the enclosure 120: a first preset parameter input 260, a second preset parameter input 262, and a third preset parameter input 264. A satisfactory choice for a parameter input is a touch-sensitive rotary encoder or potentiometer, although many other input solutions would also be satisfactory.

In this example, a single antenna 130 is present. The antenna 130 is assigned to any of the parameters of the delay effect 170 by touching the desired touch-sensitive preset parameter input 260, 262, or 264, or by stepping on the switch 240 to rotate through the options 260, 262, and 264. This assignment technique is also satisfactory if the chosen signal processing circuit has two or more parameters.

The first preset parameter input 260 outputs data to the first preset parameter input internal connection 261 and on to the microcontroller board 300. The microcontroller board 300 converts this data and the sensor output signal, if available, into a wiper control signal 390 that is sent to the control signal input 391 of the first digital potentiometer 400 to configure the wiper position thereby setting the first parameter 401 of the delay effect 170 from a current parameter value to a modified parameter value. The first low leg 140, first wiper leg 142, first high leg 144 are each connected to the corresponding circuit traces of the first parameter 401.

The second preset parameter input 262 outputs data to the second preset parameter input internal connection 263 and on to the microcontroller board 300. The microcontroller board 300 converts this data and the sensor output signal, if available, into a second control signal 392 that is sent to the second control signal input 393 of the second digital potentiometer 405 to configure the wiper position thereby setting the second parameter 406 of the delay effect 170 from a current parameter value to a modified parameter value. The second low leg 150, second wiper leg 152, second high leg 154 are each connected to the corresponding circuit traces of the second parameter 406.

The third preset parameter input 264 outputs data to the third preset parameter input internal connection 265 and on to the microcontroller board 300. The microcontroller board 300 converts this data and the sensor output signal, if available, into a third control signal 394 that is sent to the third control signal input 395 of the third digital potentiometer 410 to configure the wiper position thereby setting the third parameter 411 of the delay effect 170 from a current parameter value to a modified parameter value. The third low leg 160, third wiper leg 162, third high leg 164 are each connected to the corresponding circuit traces of the third parameter 411.

A foot-operated switch 240 is connected to a switch signal output 241 and on to the microcontroller board 300. Toggling of the switch 240 rotates the assignment of the antenna 130 to a different digital potentiometer, and also to an antenna bypass state, if desired. Other non-limiting examples of functions of the switch 240 include inverting the scaling function across the x-axis, changing the resolution of the wiper control signal 390, saving preset parameter values to memory, toggling a configuration mode, and synchronizing device settings with an internet resource.

A bypass switch 245 is connected to a bypass switch signal output 246 and on to the delay effect 170. Toggling the bypass switch enables or disables the signal processing function of the delay effect 170. Other functions for the bypass switch 245 are possible.

OPERATION—FIGS. 5, 6

In this example, the human 590 touches the first preset parameter input 260, selecting the first parameter 401 of the delay effect 170 for manipulation by the antenna 130. The human 590 sets the first preset parameter input 260 to approximately 25% of maximum, modifying a minimum threshold value for the first parameter 401. The human 590 then moves towards and away from the antenna 130 while playing an electric guitar 591, causing the first parameter 401 value to rise and fall, but never to fall beneath the approximately 25% threshold value manually set by the first preset parameter input 260. It would also be satisfactory to not allow user configuration of a minimum threshold value for the first parameter 401, instead using a predetermined default threshold value.

The human 590 then touches the third preset parameter input 264, selecting the third parameter 411 for manipulation by the antenna 130. The human 590 sets the third preset parameter input 264 to approximately 25% of full, modifying a minimum value for the third parameter 411. The human 590 then moves towards and away from the antenna 130, now causing the value of the third parameter 411 to rise and fall in the delay effect 170, but never to fall beneath the approximately 25% value manually set by the third preset parameter input 264. It would again be satisfactory to not allow user configuration of a minimum threshold value for the third parameter 411, instead using a predetermined default threshold value.

The human 590 steps on the bypass switch 245 and toggles the signal processing function of the delay effect 170 from off to on.

The human 590 steps on the switch 240 and rotates the assignment of the antenna 130 from third preset parameter input 264 to first preset parameter input 260. The human 590 continues to step on the switch and rotate through the available preset parameter inputs as needed and interact with the antenna 130 as desired.

The user repeats an equivalent of these steps as needed for as many parameter inputs as are present in the chosen audio-visual signal processing circuit.

FIGS. 7, 8—DESCRIPTION OF THIRD EXAMPLE

Figure 7:
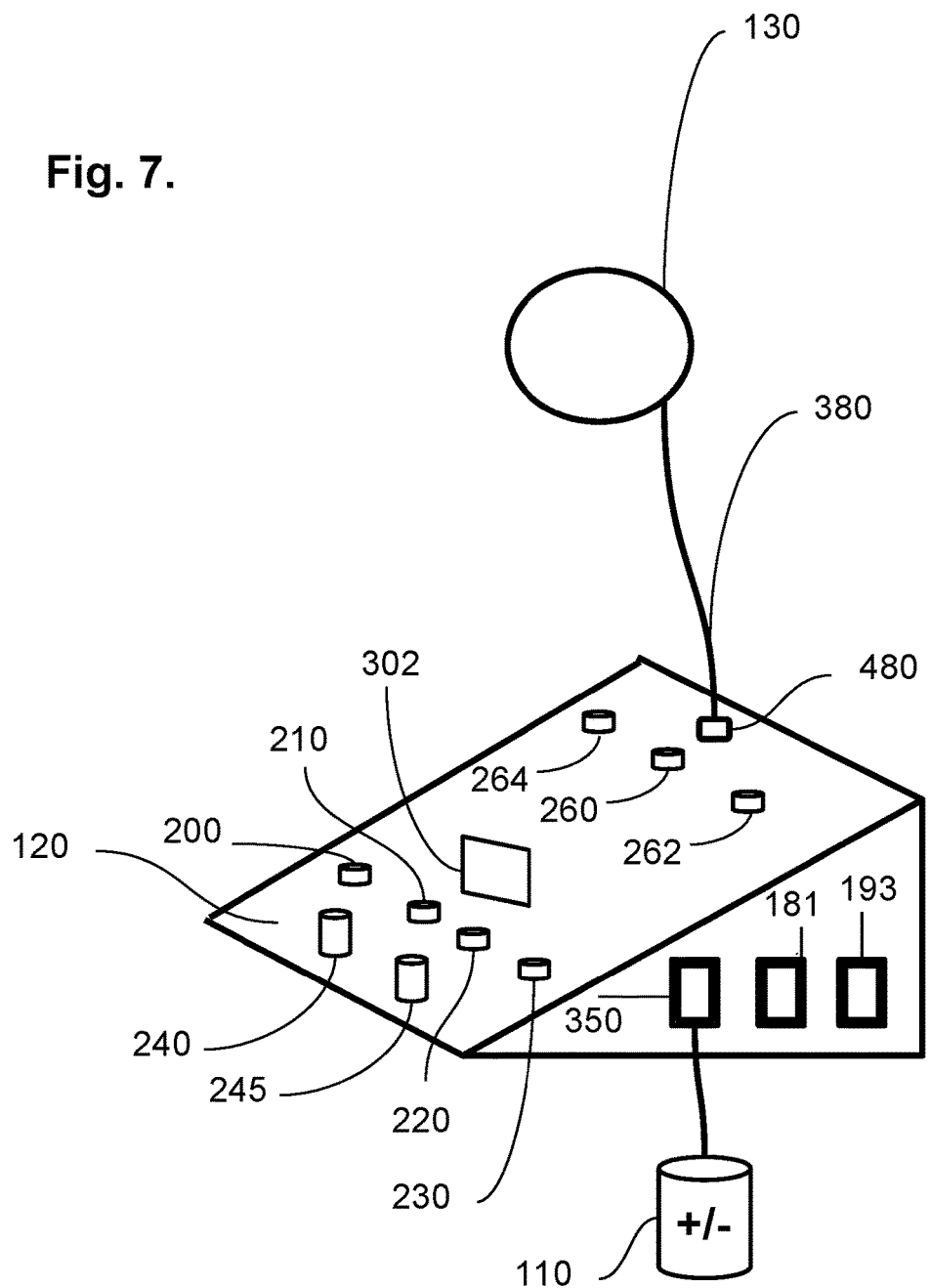
FIG. 7 shows a perspective view of various aspects of a third example of a touchless knob in accordance with the disclosure.
Figure 8:
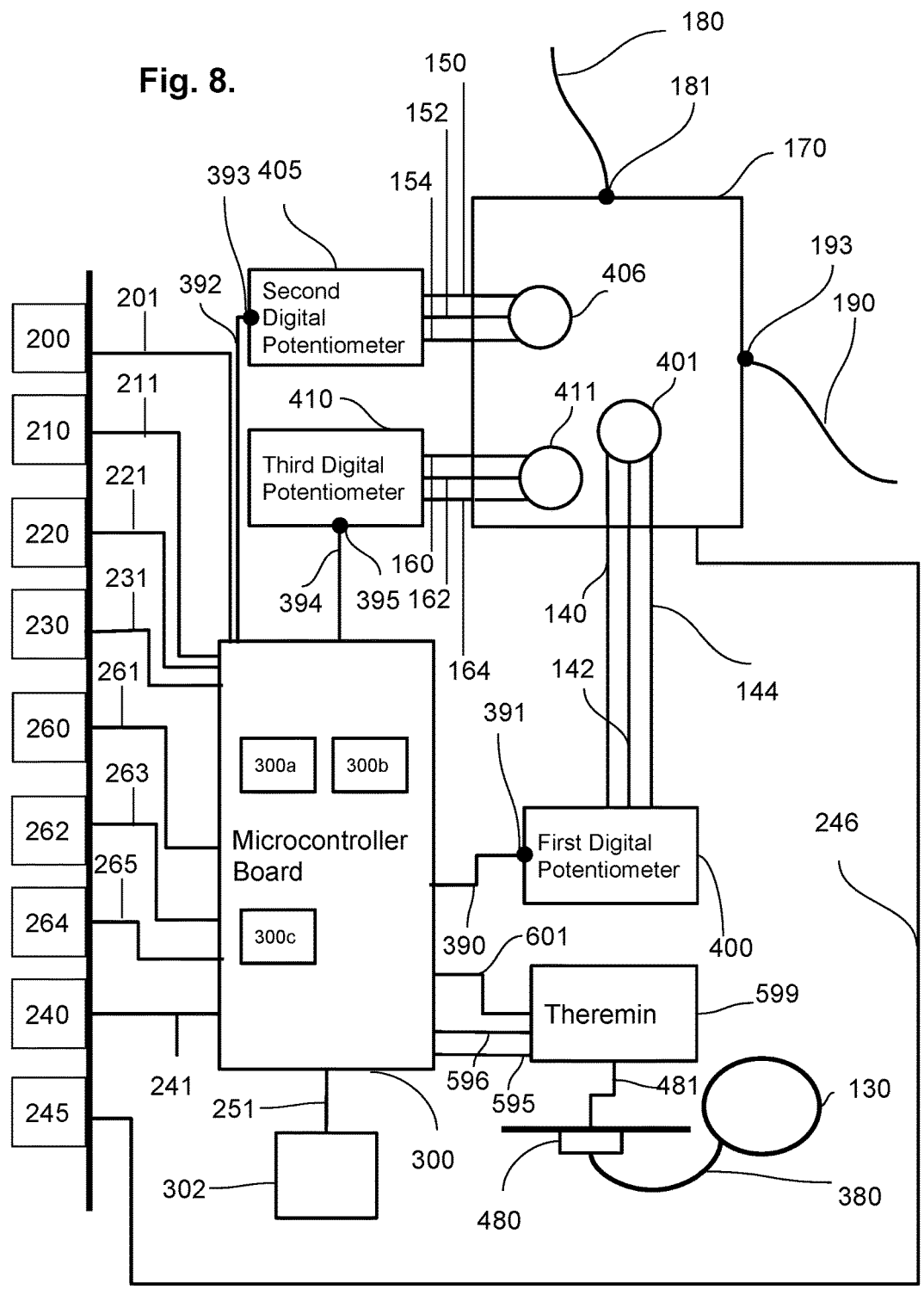
FIG. 8 shows a diagram of various aspects of the touchless knob shown in FIG. 7 in accordance with the disclosure.
Figure 27:
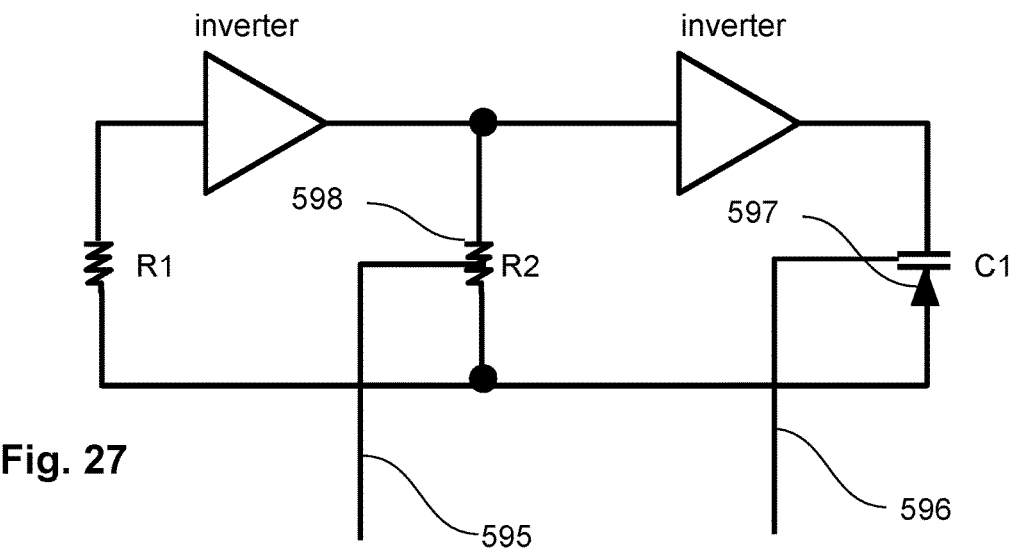
FIG. 27 shows a diagram of the first oscillator of a Theremin in accordance with the disclosure.
Figure 29:
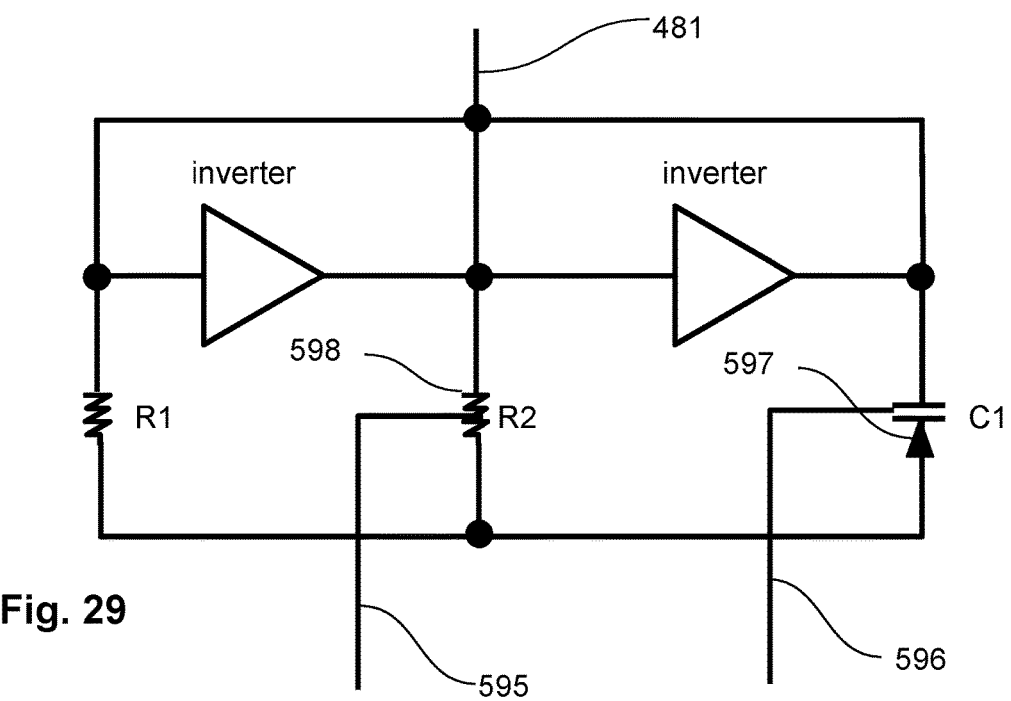
FIG. 29 shows a diagram of the second oscillator of a Theremin in accordance with the disclosure.

A third example of the touchless knob is illustrated in FIG. 7 (top view) and FIG. 8 (internal diagram). FIG. 27 (diagram of first oscillator), and FIG. 29 (diagram of second oscillator)

FIG. 27 shows the first oscillator within the Theremin 599 in this embodiment. The first oscillator contains a digital potentiometer 598 that is connected to the microcontroller board 300 by a resistive control signal 595. The first oscillator within the Theremin 599 also features a varactor diode 597 that is connected to the microcontroller board 300 by a capacitive control signal 596. A DC voltage in the range of approximately 0-3v applied to the varactor diode 597 is a satisfactory choice for a capacitive control signal 596, although other signal choices would also be satisfactory, A signal indicating the current wiper position of the digital potentiometer 598 sent by a protocol such as SPI or I2C is a satisfactory solution for a resistive control signal 595, although other methods would also be satisfactory. It also would be satisfactory in this embodiment to replace one of the two variable RC oscillator parameters C1 (varactor diode 597) and R2 (digital potentiometer 598) with an equivalent, manual or static component. An algorithm to control the capacitive control signal 596 and the resistive control signal 595 is programmed into the microcontroller board 300.

A control algorithm that assists in delivering a natural feel to the touchless knob interface is programmed into the microcontroller board 300. This algorithm also can be used to apply a simulated potentiometer taper, such as a linear or a log taper. This algorithm can be programmed into the microcontroller board 300 using predetermined default values without adding any additional input interfaces, and that is satisfactory, however in this embodiment additional input interfaces are described to enable user configuration of preset parameters of the control algorithm as desired.

A control algorithm that applies a scaling function to the control signal 390 is programmed into the microcontroller board 300. A software flow chart of the control algorithm programmed into the microcontroller board 300 is shown in FIG. 22. In this embodiment, the value of the control instruction, which is used to derive the control signal 390 and is a value within the 10-bit range of 0 and 1024, is calculated using a logistic function of the form shown in FIG. 19:

$$y = h(1024/(1+e^{\wedge}(-k(x-x0)))) + N$$

where x is the range-scaled frequency of the monophonic audio signal 601, and y is the control instruction. Satisfactory default preset function parameter values here are h=1, k=1, x0=10, N=0, although other default preset function parameter values would also be satisfactory. Although a logistic function is shown, other scaling functions, including but not limited to exponential or cotangent functions, would also be satisfactory and it would be satisfactory to furthermore provide preset function parameters and preset function parameter values that are appropriate to the form and domain of the chosen scaling function.

The microcontroller board 300 takes a frequency measurement from the monophonic audio signal 601. The frequency measurement falls within a first predetermined range of values, and is constrained to this first predetermined range if it exceeds the range boundaries. This value is then translated to a zero-based value by subtracting the value of the first predetermined range low boundary from the frequency measurement, resulting in a first value. Next, the microcontroller board 300 translates this first value to a second value, x, which is in the second predetermined range of approximately (0, 20), in order to exploit the interesting contours of the logistic scaling function with the above defaults. To do this, the microcontroller board 300 scales the first value from within the range of (0, first predetermined range high boundary—first predetermined range low boundary) to approximately within the range of (0, 20). This produces a range-scaled value of x which is subsequently used in the scaling function to compute the value of a control instruction, which is subsequently used to configure the control signal 390.

In this embodiment, the curve of the logistic function is further modified by adjusting the preset function parameters k, x0, h, and N. This provides the advantageous option to control the shape of the curve as desired, which can improve the perceived feel of the touchless sensor. An example of this would be to map the range of the touchless sensor to the range of an audio taper potentiometer. It would furthermore be satisfactory to omit some, all, or none of these preset parameters and input controllers, as desired, instead using a fixed predetermined value for the preset parameter represented by the omitted input controller.

Figure 13:
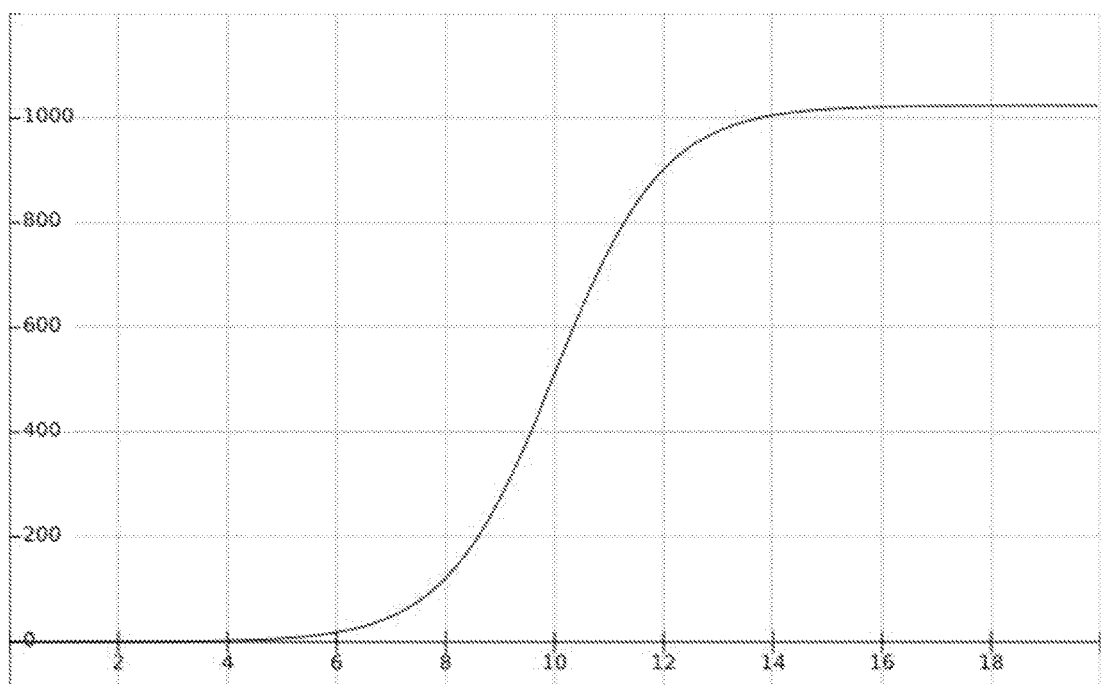
FIG. 13 shows a plot of a logistic scaling function of touchless sensor output signal vs. control instruction in accordance with the disclosure.
Figure 14:
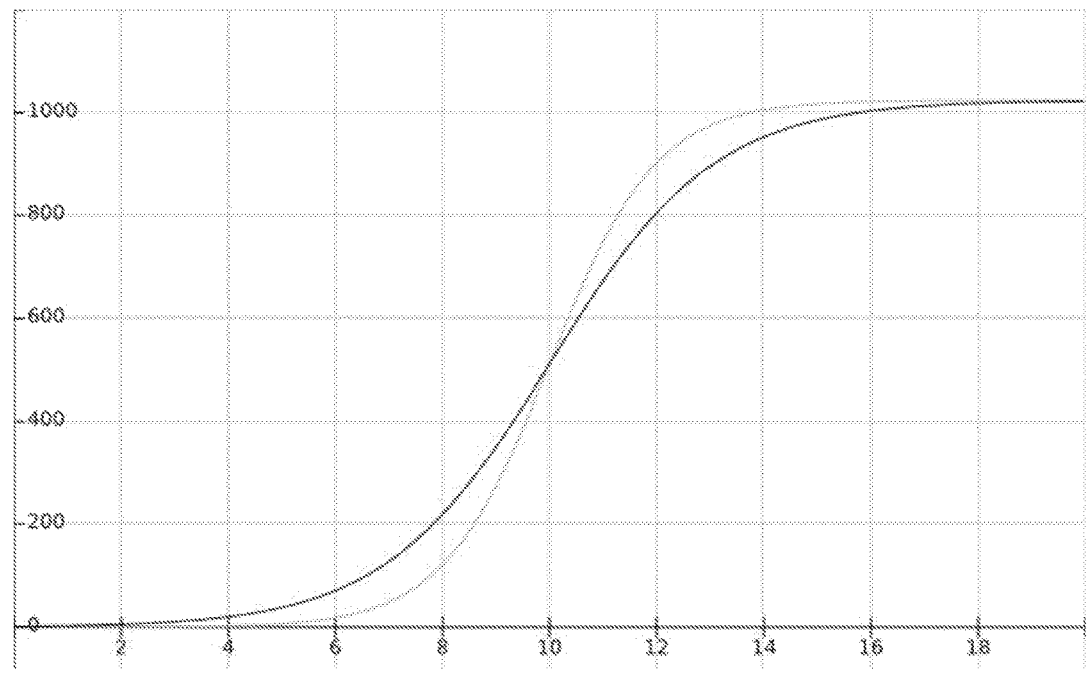
FIG. 14 shows the plots of two logistic scaling functions of touchless sensor output signal vs. control instruction where the gray line shows the control plot of FIG. 13 and the black line shows the plot adjusted for parameter k=0.65 in accordance with the disclosure.

A first input controller 200 is connected to a first input controller signal output 201 which is connected to a microcontroller board 300 and through these operative connections the first input controller 200 indicates values for the preset parameter k to the microcontroller board 300. A useful range of values for the preset parameter k is 0.65 to 2.0, although other ranges are satisfactory. FIG. 14 shows the scaling function of FIG. 13 in light gray contrasting the scaling function with k=0.65 in black. FIG. 14 shows the scaling function of FIG. 13 in light gray contrasting the scaling function with k=2.0 in black.

Figure 16:
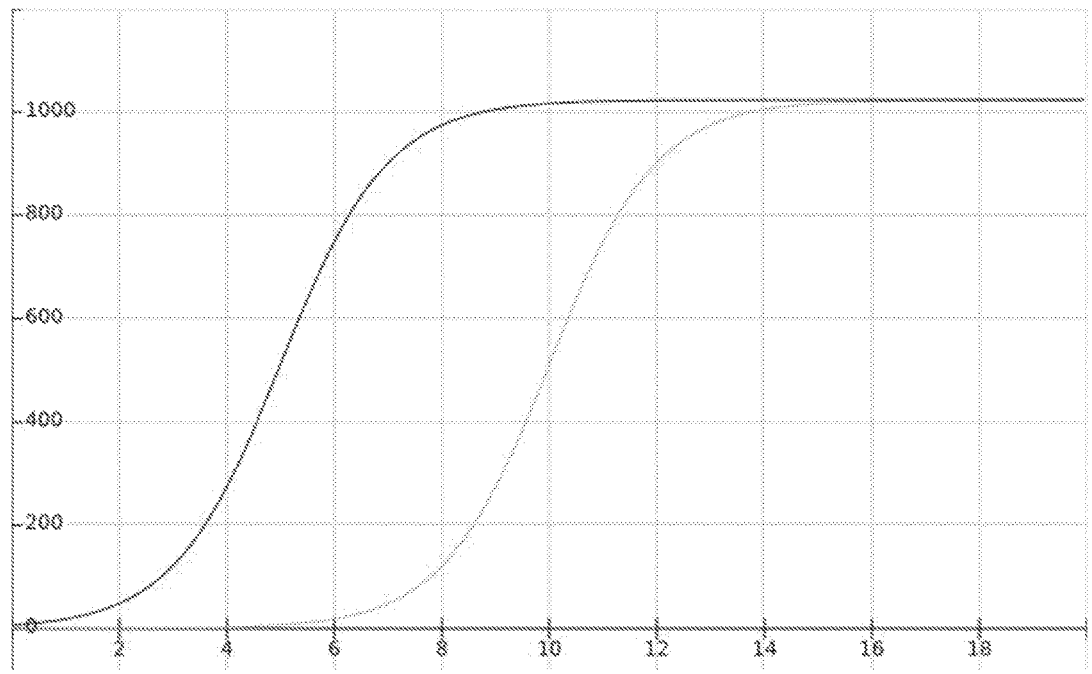
FIG. 16 shows the plots of two logistic scaling functions of touchless sensor output signal vs. control instruction where the gray line shows the control plot of FIG. 13 and the black line shows the plot adjusted for parameter x0=5 in accordance with the disclosure.
Figure 17:
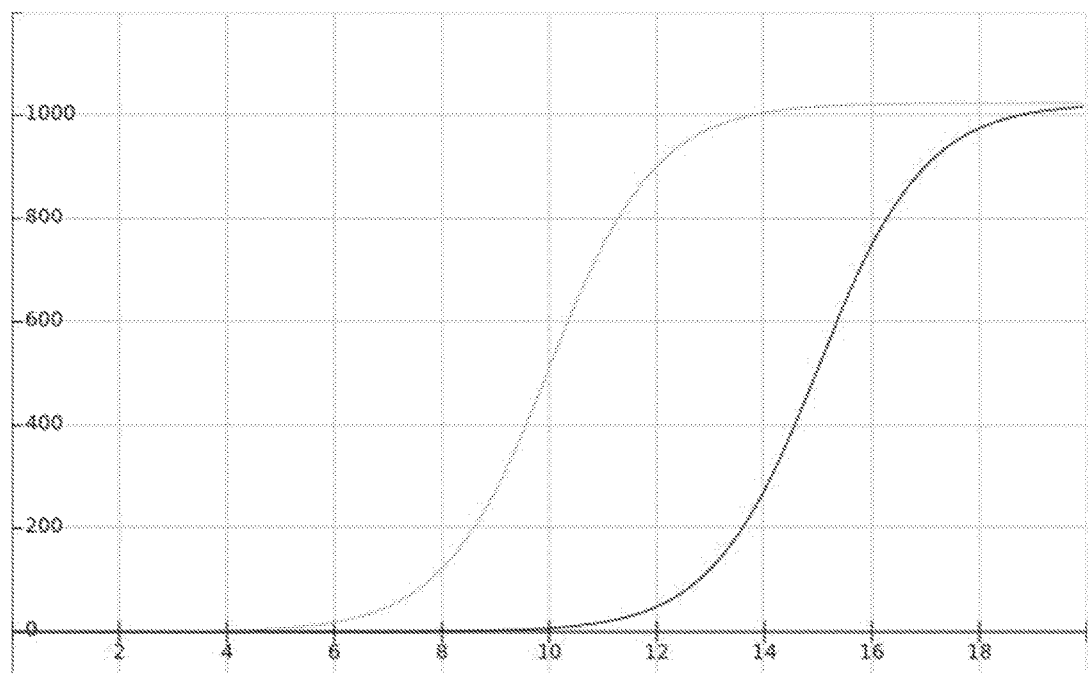
FIG. 17 shows the plots of two logistic scaling functions of touchless sensor output signal vs. control instruction where the gray line shows the comparison plot of FIG. 13 and the black line shows the plot adjusted for parameter x0=15 in accordance with the disclosure.

A second input controller 210 is connected to a second input controller signal output 211 which is connected to a microcontroller board 300 and through these operative connections the second input controller indicates values for the preset parameter x0 to the microcontroller board 300. A useful range of values for the preset parameter x0 is 5.0 to 15.0, although other ranges are satisfactory. FIG. 16 shows the scaling function of FIG. 13 in light gray contrasting the scaling function with x0=5 in black. FIG. 17 shows the scaling function of FIG. 13 in light gray contrasting the scaling function with x0=15 in black.

Figure 18:
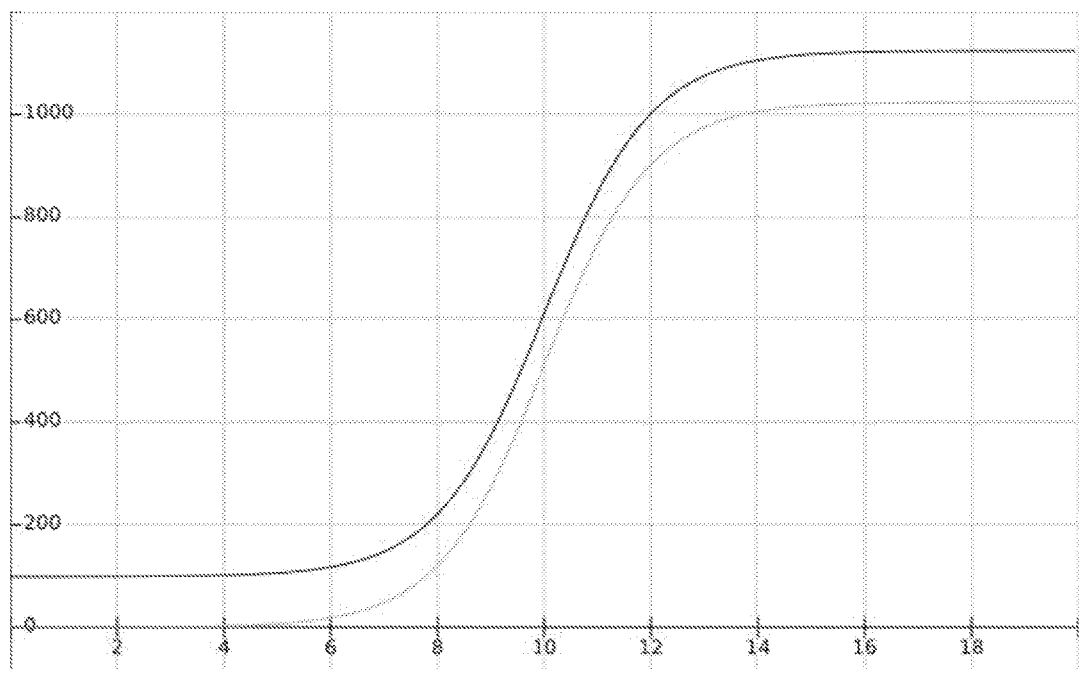
FIG. 18 shows the plots of two logistic scaling functions of touchless sensor output signal vs. control instruction where the gray line shows the comparison plot of FIG. 13 and the black line shows the plot adjusted for parameter N=100 in accordance with the disclosure.
Figure 19:
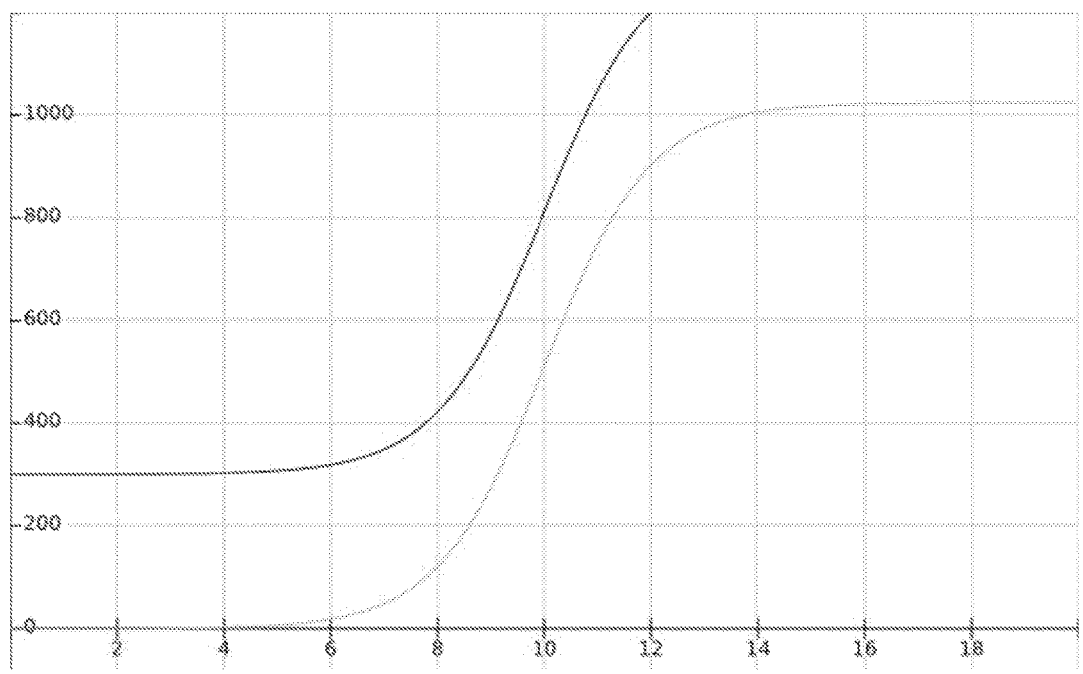
FIG. 19 shows the plots of two logistic scaling functions of touchless sensor output signal vs. control instruction where the gray line shows the comparison plot of FIG. 13 and the black line shows the plot adjusted for parameter N=300 in accordance with the disclosure.

A third input controller 220 is connected to a third input controller signal output 221 which is connected to the microcontroller board 300 and through these operative connections the third input controller 220 indicates values for the preset parameter N to the microcontroller board 300. A useful range of values for the preset parameter N is −100 to 500, although other ranges are satisfactory. FIG. 18 shows the scaling function of FIG. 13 in light gray contrasting the scaling function with N=100 in black. FIG. 19 shows the scaling function of FIG. 13 in light gray contrasting the scaling function with N=300 in black.

Figure 20:
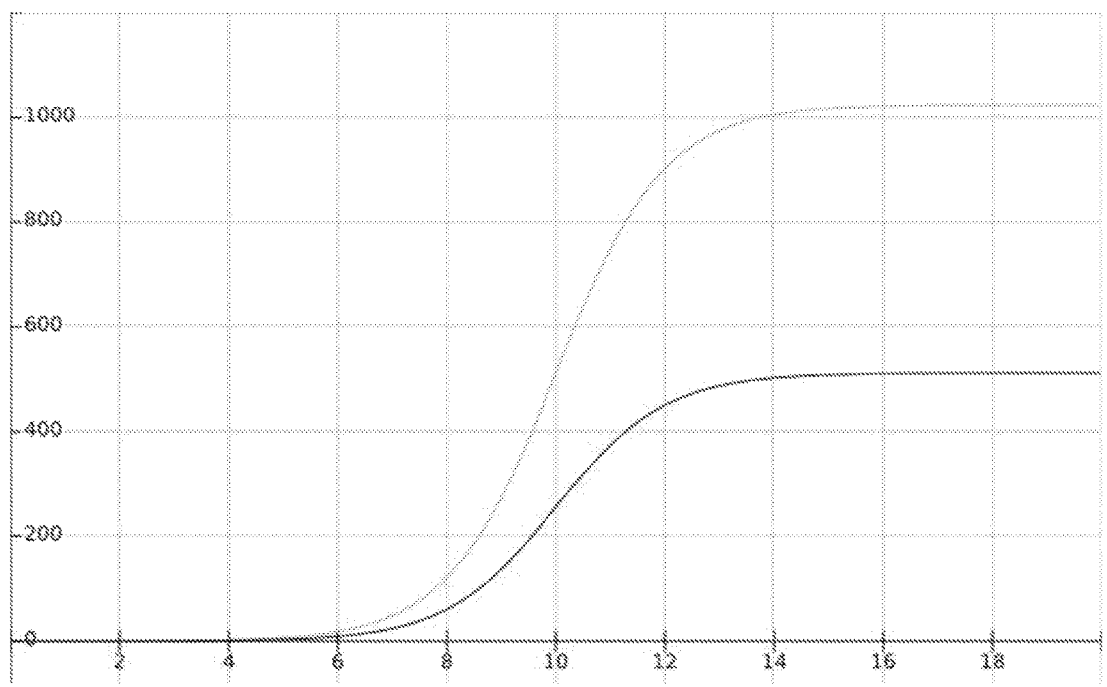
FIG. 20 shows the plots of two logistic scaling functions of touchless sensor output signal vs. control instruction where the gray line shows the comparison plot of FIG. 13 and the black line shows the plot adjusted for parameter h=0.5 in accordance with the disclosure.

A fourth input controller 240 is connected to a fourth input controller signal output 231 which is connected to the microcontroller board 300 and through these operative connections the fourth input controller 240 indicates values for the preset parameter h to the microcontroller board 300. A useful range of values for the preset parameter h is 0.25 to 1.0, although other ranges are satisfactory. FIG. 20 shows the scaling function of FIG. 13 in light gray contrasting the scaling function with h=0.5 in black.

For the input controllers 200, 210, 220, and 230, a rotary encoder, potentiometer, fader, or touchscreen would be a satisfactory implementation choice, although several other options would also be satisfactory.

Next, the microcontroller board 300 calculates a control instruction and uses it to configure and emit the control signal 390 to the control signal input 391.

A user interface 302 is connected to a communication connection 251 which is connected to the microcontroller board 300. In this example, the user interface is a touchscreen 302. Other user interfaces are possible. Non-limiting examples of user interfaces further include non-touchscreen displays, liquid crystal based displays (LCDs), light emitting diode based displays (LED displays), touchscreens, and USB (universal serial bus) connectors, Non-limiting examples of communication connections include USB cables, multi-conductor cables, bluetooth, ethernet, or wireless connections. Other wired and wireless choices for a communication connection 251 are possible.

Figure 21:
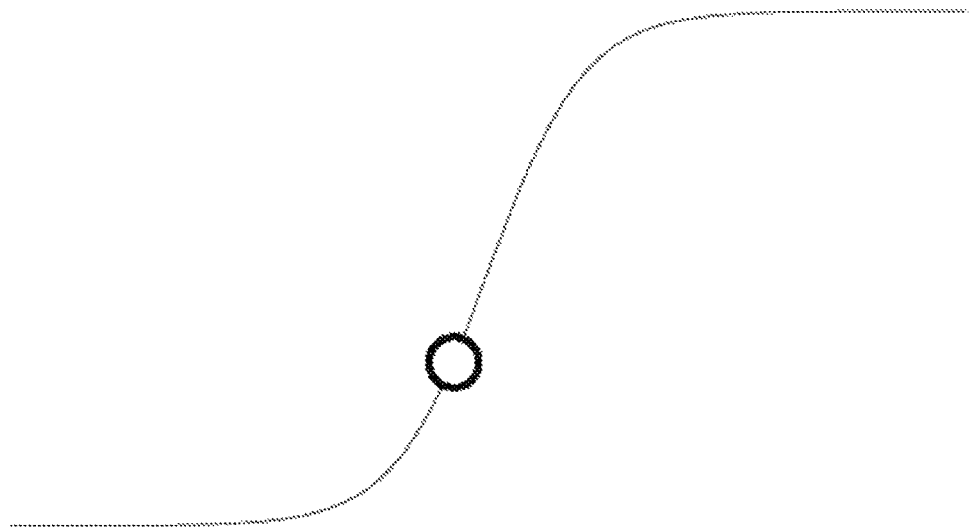
FIG. 21 shows a graphical rendering of an approximately instantaneous measurement of a touchless sensor output signal, indicated by a circle, superimposed upon a plot of a scaling function in accordance with the disclosure.

The microcontroller board 300 sends an information output to the touchscreen 302 via the communication connection 251. FIG. 21 shows a satisfactory choice for the information output: a graphical display of sensor output signal plotted upon the scaling function, with a circle showing the instantaneous range-scaled sensor output signal value, and a black line showing a scaling function of the type shown in FIGS. 12, 13, 14, 15, 16, 17, 18, 19, 20. Other non-limiting examples of information output include serial data, status data, preset data, operational status information, HTTP (hypertext transfer protocol) posts, and API (application programming interface) calls.

The touchscreen 302 sends any touchscreen input information collected to the microcontroller board 300 via the communication connection 251. It is possible to create additional input controllers for selecting or modifying preset parameters by creating an onscreen slider or knob on the touchscreen 302.

These additional input controllers allow finer contouring of the control signals 390, 392, and 394, which can be very useful when attempting to customize the scaled curve to the flatter the behavior of different signal processing circuits, or to adjust the natural feel of the touchless knob interface between the antenna 130 and the operator. It is important to note that operation does not rely on the availability of these additional input controllers. Following this, it would be satisfactory to provide any combination of zero, one, two, three, four, five, or more additional input controllers, as desired, to provide useful but optional interface elements in accordance with a selected control algorithm.

FIGS. 8, 9—OPERATION OF THIRD EXAMPLE

First, the Theremin 599 is calibrated. The Human 590 is positioned at the desired maximum distance from the antenna 130 such that the second oscillator within the Theremin 599 is minimally affected by capacitance seen at the antenna 130. FIG. 27 shows the second oscillator within the Theremin 599. The microcontroller board 300 then manipulates the frequency of the first oscillator within the Theremin 599 by sweeping the range of the resistive control signal 595 causing a change in the value R2, or sweeping the range of the capacitive control signal 596 causing a change in the value C1, or both. The frequency of the first oscillator can be approximately calculated with the formula $1/(2.2*R2*C1)$ where R2 is the instantaneous resistance value of the digital potentiometer 595 and C1 is the instantaneous capacitive value of the varactor diode 597 as it is biased by the capacitive control signal 596.

This manipulation continues as the microcontroller board 300 analyzes the monophonic audio signal 601 until the quiescent beat frequency resulting from the combination of the frequency output of the first and second oscillators is approximately 200 Hz to 3000 Hz, and such that this beat frequency increases as the human 590 approaches the antenna 130.

Figure 9:
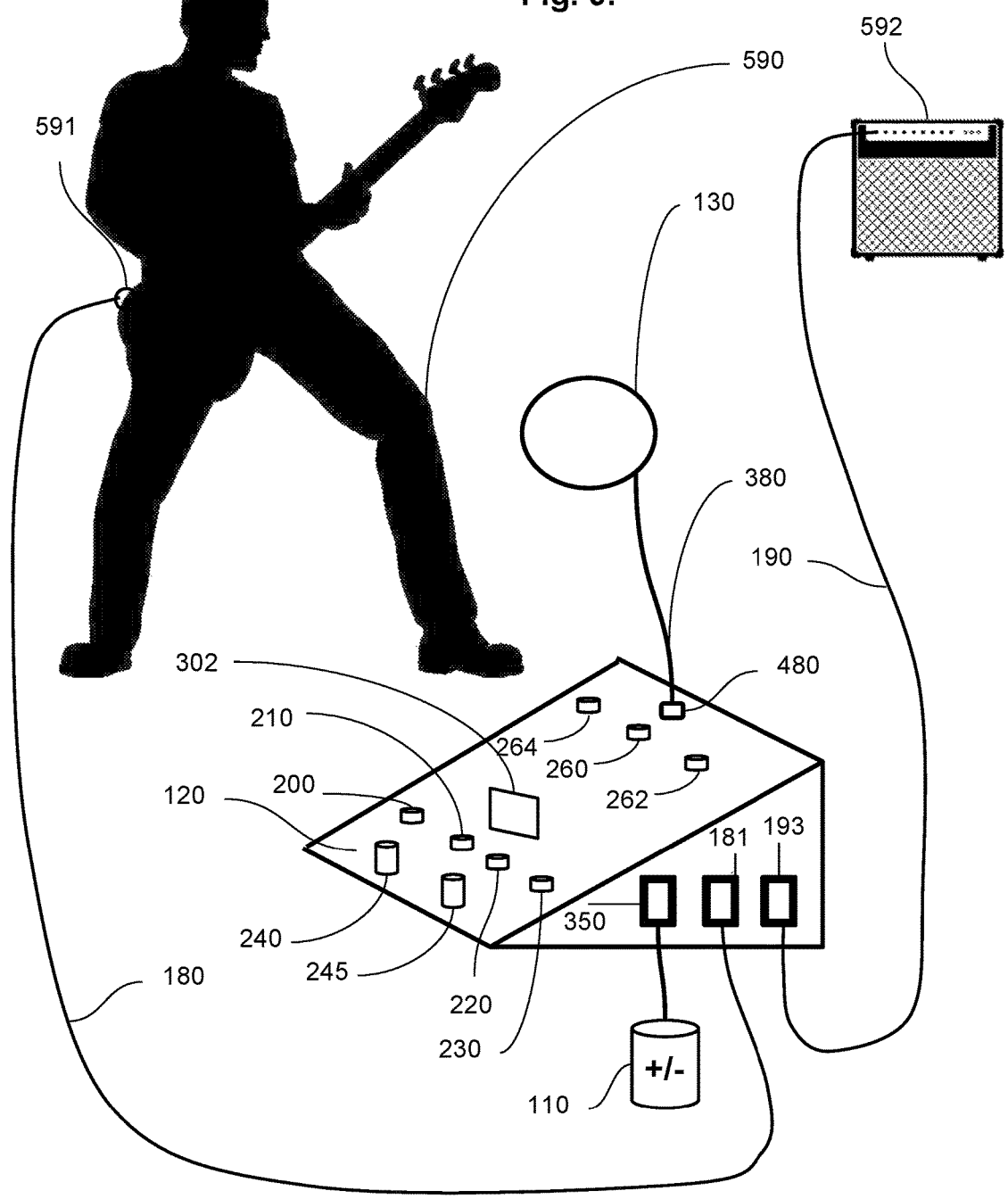
FIG. 9 shows a perspective view of various aspects of the touchless knob shown in FIG. 7 and a method of use in accordance with the disclosure.

Next, in FIG. 9, the human 590 generates and emits a signal from the electric guitar 591, and moves towards the antenna 130 to a first distance, and then away from the antenna 130 to a second distance, and to positions in between those distances, as desired. The human 590 furthermore adjusts the first input controller 200, the second input controller 210, the third input controller 220, and the fourth input controller 230 changing the preset parameter inputs to the scaling function of the control algorithm programmed into the microcontroller board 300 thereby affecting the the calculated result for the control instruction used to program the control signal 390. The human 590 sees the results of the modifications on the touchscreen 302, wherein a visualization that approximates the shape of the resulting scaling function is displayed, upon which an approximately instantaneous reading from the touchless sensor is plotted, such as is shown in FIG. 18.

The human 590 sets a preset value for N using the third input controller 220 such that the control signal never falls below a certain value, thereby allowing the audio signal processing circuit 170 to be supplied at all times with at least a minimum parameter value while still offering the human 590 the ability to use the antenna 130 to further vary the control signal 390 in the remaining headroom.

Figure 15:
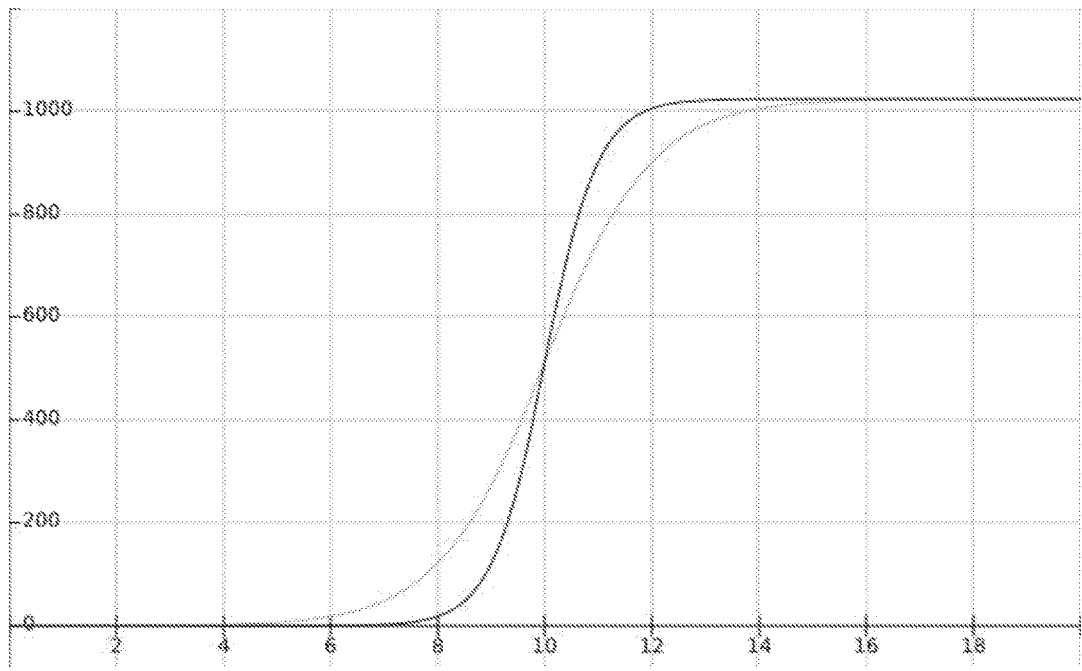
FIG. 15 shows the plots of two logistic scaling functions of touchless sensor output signal vs. control instruction where the gray line shows the control plot of FIG. 13 and the black line shows the plot adjusted for parameter k=2 in accordance with the disclosure.

The human 590 sets a preset value for k using the third input controller 200, changing the shape of the scaling function to best exploit the behavior of the chosen parameter input of the audio-visual signal processing circuit 170. FIG. 14 shows the scaling function of FIG. 13 in light gray contrasting the scaling function with k=0.65 in black. FIG. 15 shows the scaling function of FIG. 13 in light gray contrasting the scaling function with k=2.0 in black.

The human 590 sets a preset value for x0 using the third input controller 210, changing the shape of the scaling function to best exploit the behavior of the chosen audio-visual signal processing circuit 170. FIG. 16 shows the scaling function of FIG. 13 in light gray contrasting the scaling function with x0=5 in black. FIG. 17 shows the scaling function of FIG. 13 in light gray contrasting the scaling function with x0=15 in black.

The human 590 sets a preset value for h using the third input controller 220, changing the shape of the scaling function to best exploit the behavior of the chosen audio-visual signal processing circuit 170. FIG. 18 shows the scaling function of FIG. 13 in light gray contrasting the scaling function with N=100 in black. FIG. 19 shows the scaling function of FIG. 13 in light gray contrasting the scaling function with N=300 in black.

The human 590 engages the switch 240 rotating the selected preset parameter input for the antenna 130 from the first preset parameter input 260 to the second preset parameter input 262. The human 590 continues to engage the switch to rotate through all available preset parameter inputs as desired.

The human 590 sees the results of these adjustments on the touchscreen 302, and continues to make further adjustments as desired, including setting preset values for the preset function parameters k, x0, h, and N from saved preset parameters loaded from the microcontroller board 300, and saving current values of k, x0, h, and N to stored preset values on the microcontroller board 300 to be recalled later.

FIG. 10—DESCRIPTION OF FOURTH EXAMPLE

Figure 10:
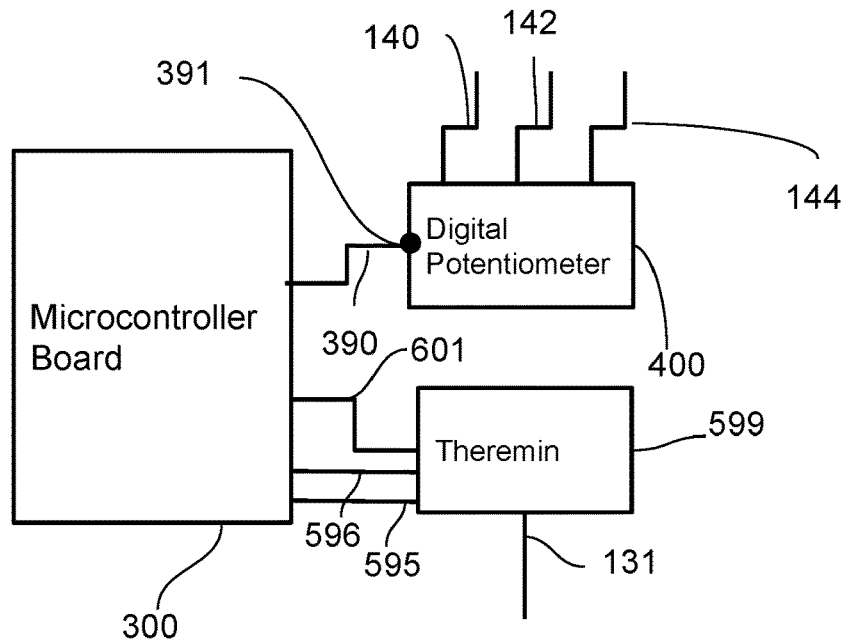
FIG. 10 shows a diagram of various aspects of a fourth example of a touchless knob in accordance with the disclosure.

FIG. 10 shows a fourth example of a touchless knob suitable for miniaturization or internal installation in another device. The external connective elements and the enclosure 120 have been removed. The antenna 130 and its associated connective elements are replaced by a minimum antenna 131 which performs an equivalent function. The minimum antenna 131 is a predetermined quantity of electrically conductive material. A satisfactory choice for a minimum antenna 131 would be a solder terminal, a circuit trace, or a length of conductive wire cut to a predetermined length, although other choices of electrically conductive material would also be satisfactory. The minimum antenna 131 interacts with a human 590 and a Theremin 599 in the same manner as the antenna 130.

A control algorithm that assists in delivering a natural feel to the touchless knob interface is programmed into the microcontroller board 300. This algorithm is programmed using predetermined preset values in the absence of any optional interface elements.

FIG. 11—DESCRIPTION OF FIFTH EXAMPLE

Figure 11:
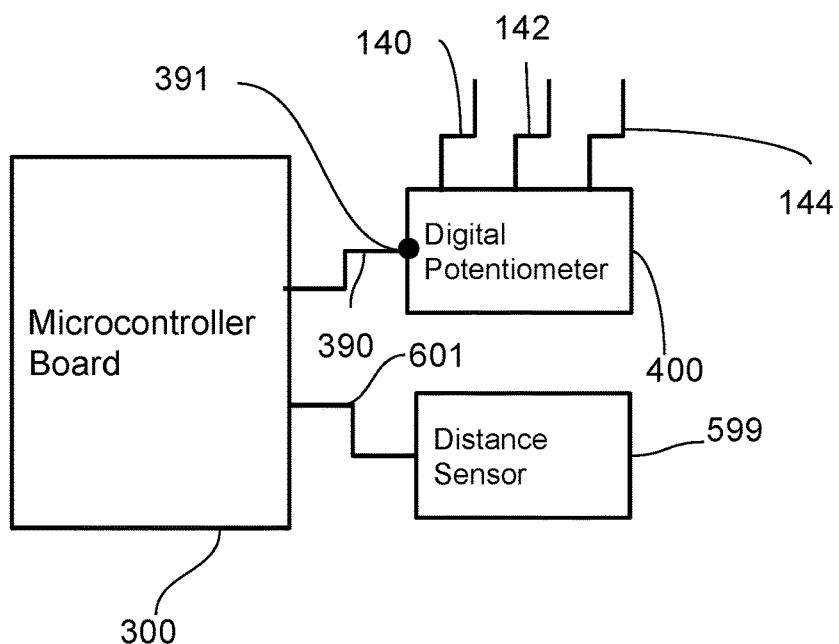
FIG. 11 shows a diagram of various aspects of a fifth example of a touchless knob in accordance with the disclosure.
Figure 12:
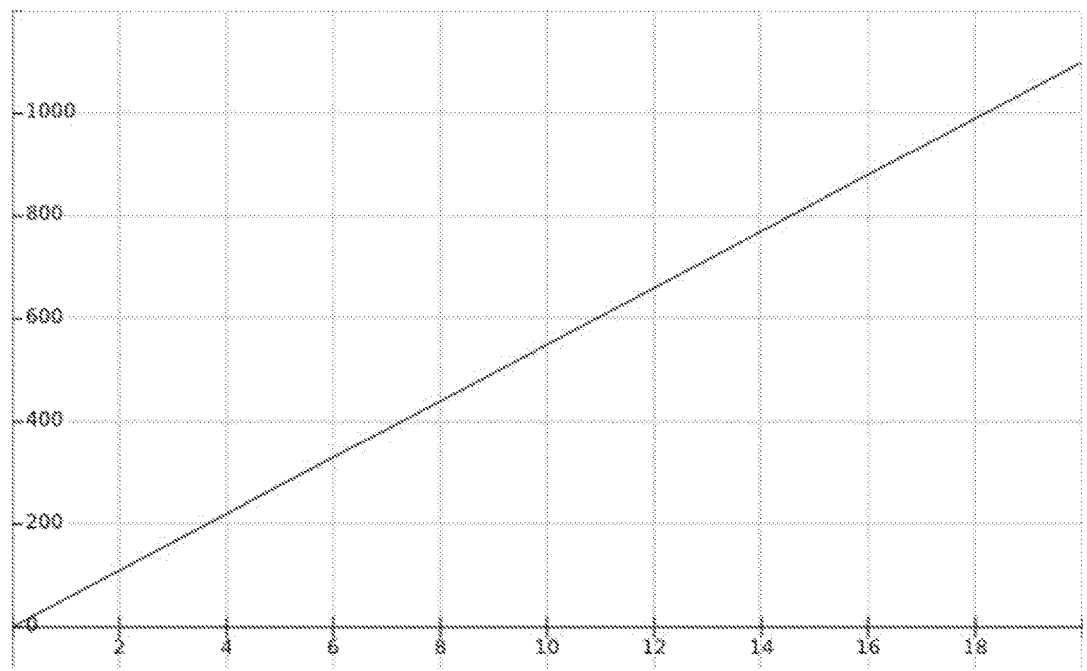
FIG. 12 shows a plot of a linear function of sensor output signal vs. control instruction in accordance with the disclosure.

FIG. 11 shows a fifth example similar to the example of FIG. 10, however the touchless sensor 599 is a distance sensor 599. Non-limiting examples of distance sensors include an ultrasonic reflection sensor, a infrared light reflection sensor, and a capacitive sensor. A plurality of commercially available satisfactory distance sensors of these and other types exist today.

The touchless sensor output signal 601 is a distance sensor output 601 The distance sensor output 601 is connected to the microcontroller board 300.

The distance sensor output 601 emits a sensor output signal expressing values in a predetermined range. These values are captured by the microcontroller board 300 and similarly used to calculate a control instruction which is then used to set the control signal 390.

A control algorithm that assists in delivering a natural feel to the touchless knob interface is programmed into the microcontroller board 300. This algorithm is programmed using predetermined default values in the absence of any optional interface elements.

FIGS. 23, 24—DESCRIPTION OF SIXTH EXAMPLE

Figure 23:
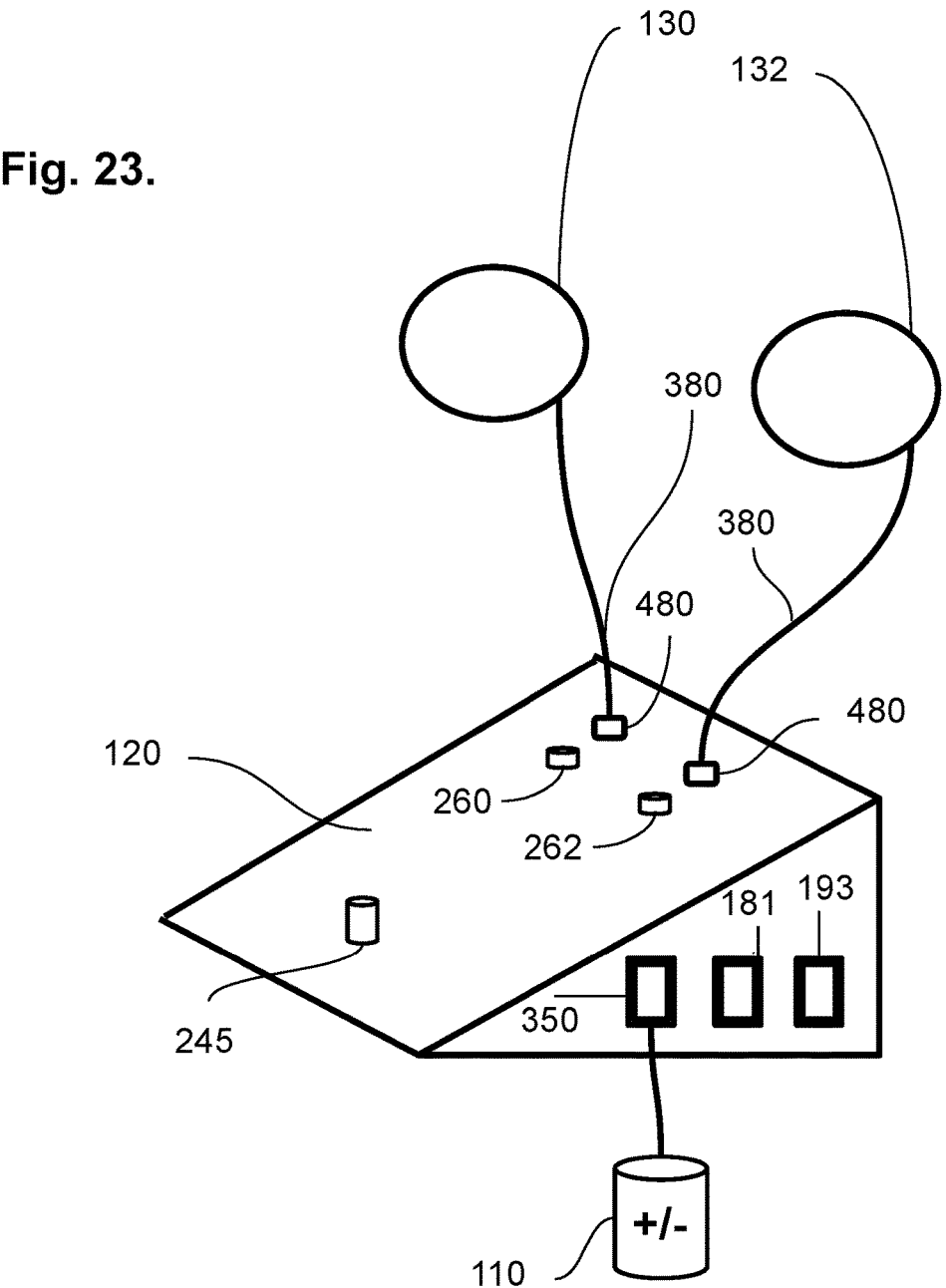
FIG. 23 shows a perspective view of various aspects of a sixth example of a touchless knob in accordance with the disclosure.
Figure 24:
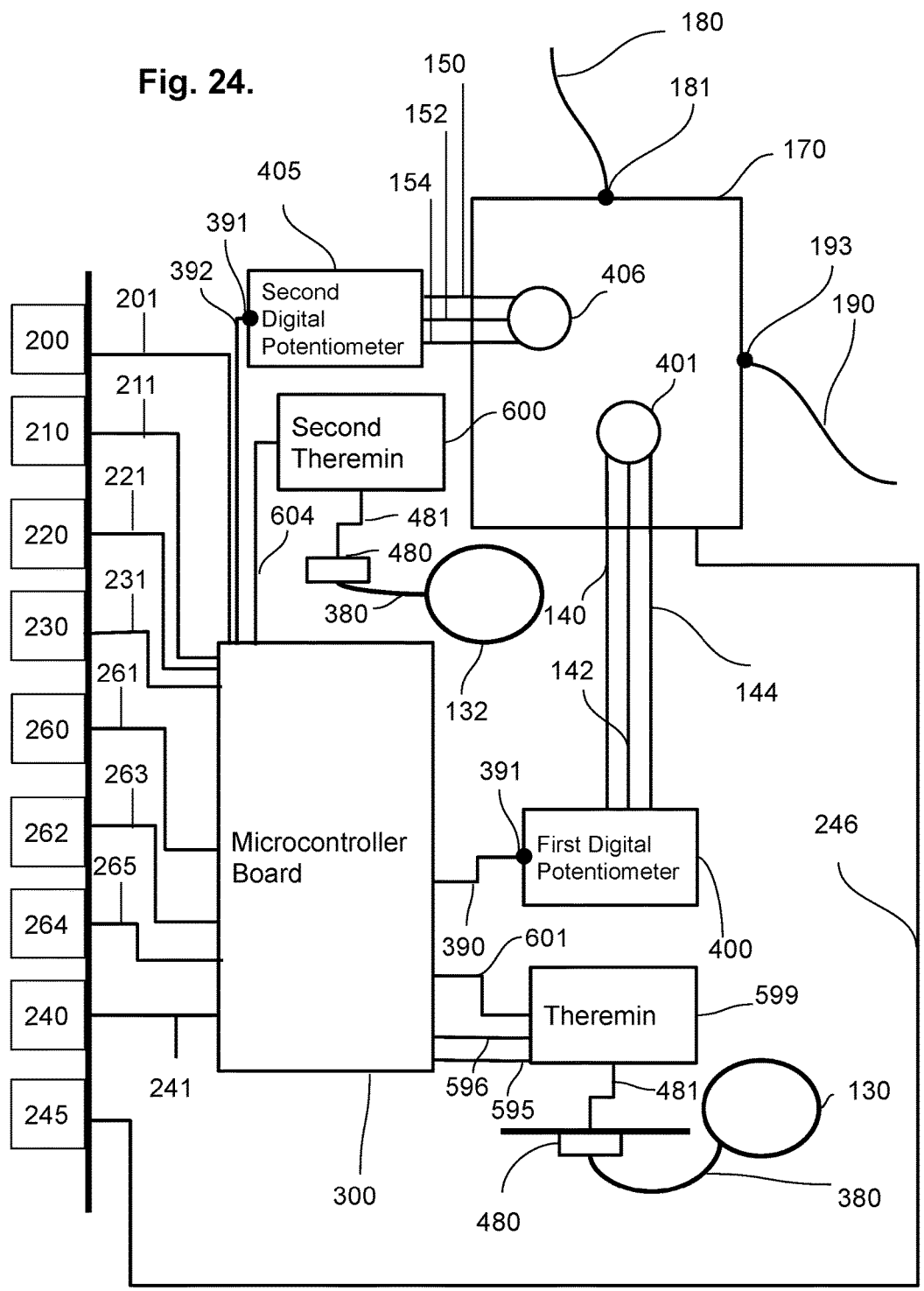
FIG. 24 shows a diagram of various aspects of the touchless knob shown in FIG. 23 in accordance with the disclosure.
Figure 25:
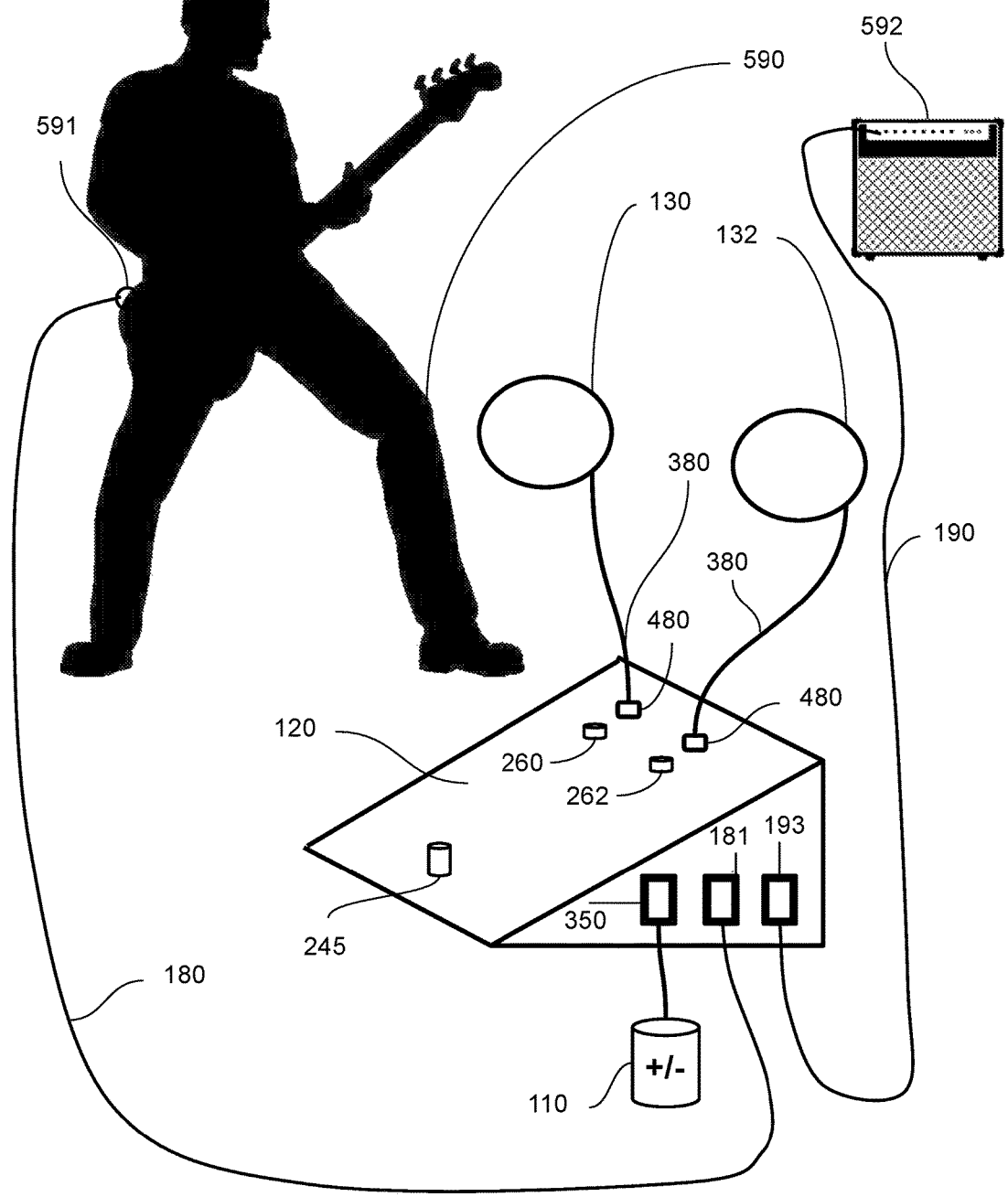
FIG. 25 shows a perspective view of various aspects of the touchless knob shown in FIG. 23 and a method of use in accordance with the disclosure.

A sixth example of the touchless knob is illustrated in FIG. 23 (top view) and FIG. 24 (internal diagram). A second antenna 132 has been added and it is operatively connected to a second touchless sensor 600. In the example depicted here, the second touchless sensor 600 is a second Theremin 600. Other second touchless sensors are possible.

The second Theremin 600 emits a second touchless sensor output signal 604 to the microcontroller board 300. In the example depicted here, the second touchless sensor output signal 604 is a second monophonic audio signal 604. This second Theremin 600 operates equivalently but discretely from Theremin 599. Theremin 599 is directly associated with first preset parameter input controller 260, and second Theremin 600 is directly associated with second preset parameter input controller 262. The microcontroller board 300 processes the second monophonic audio signal 604 equivalently to how it processes the monophonic audio signal 601, but directly associates the second monophonic audio signal 604 with control of the second parameter 406 of the audio-visual signal processing circuit 170 whereas the monophonic audio signal 601 is directly associated with the first parameter 401 of the signal processing circuit 170.

FIG. 25—OPERATION

The human 590 interacts with antenna 130 and affects the first parameter 401 of the signal processing circuit 170. The human 590 interacts with the second antenna 132 and affects the second parameter 406 of the signal processing circuit 170.

FIGS. 30, 31—DESCRIPTION OF SEVENTH EXAMPLE

Figure 30:
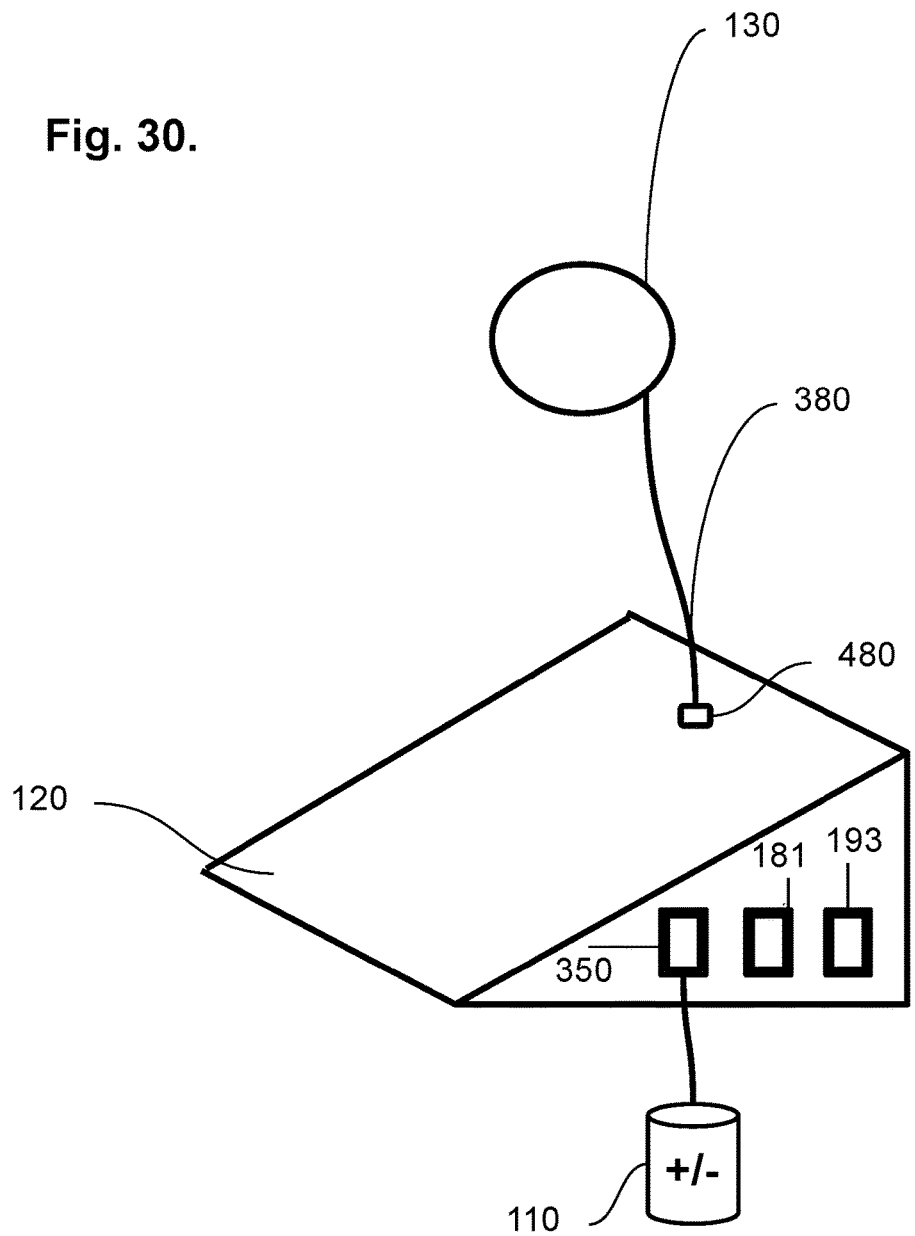
FIG. 30 shows a perspective view of various aspects of a seventh example of a touchless knob in accordance with the disclosure.
Figure 31:
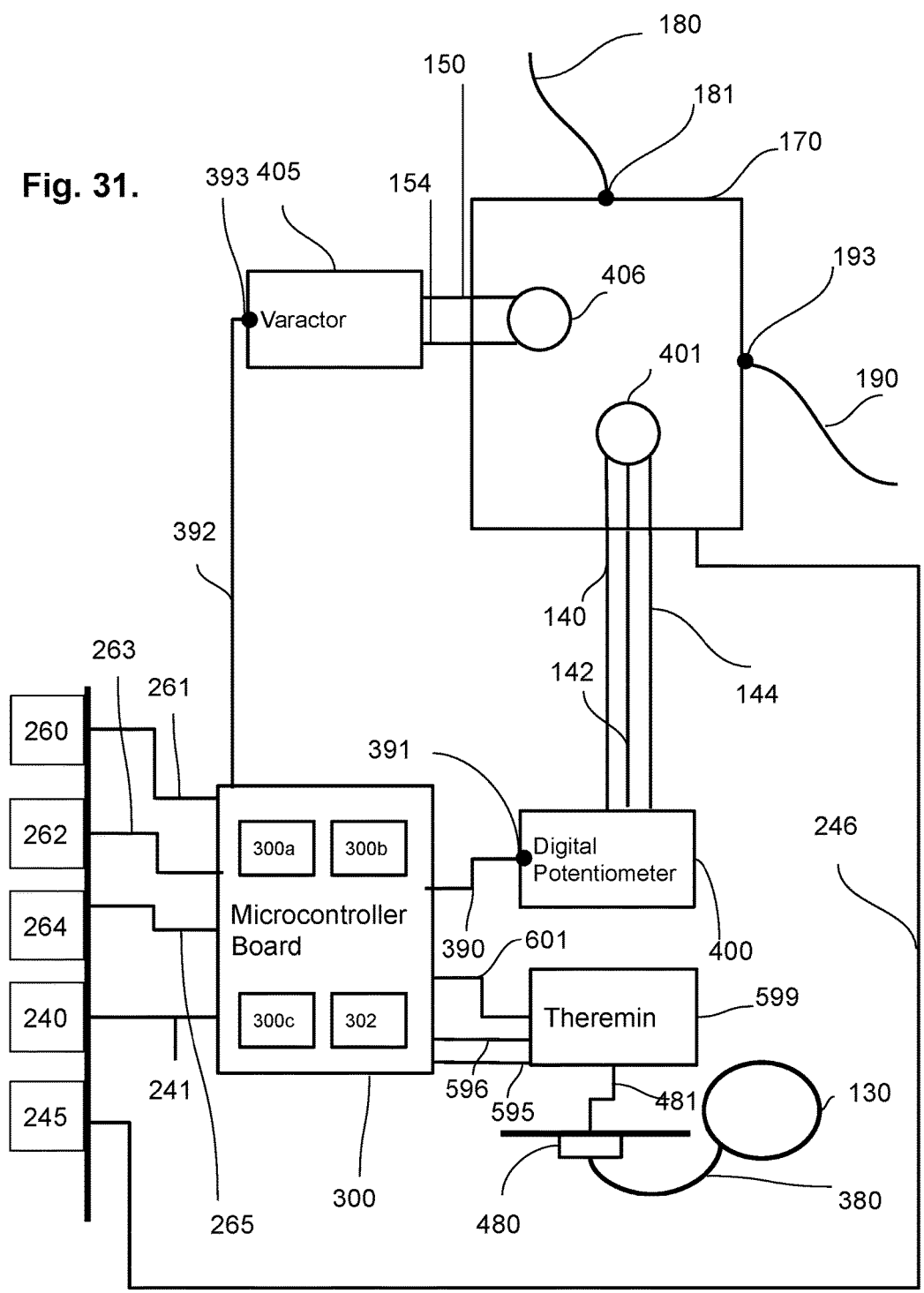
FIG. 31 shows a diagram of various aspects of the touchless knob shown in FIG. 30 in accordance with the disclosure.
Figure 32:
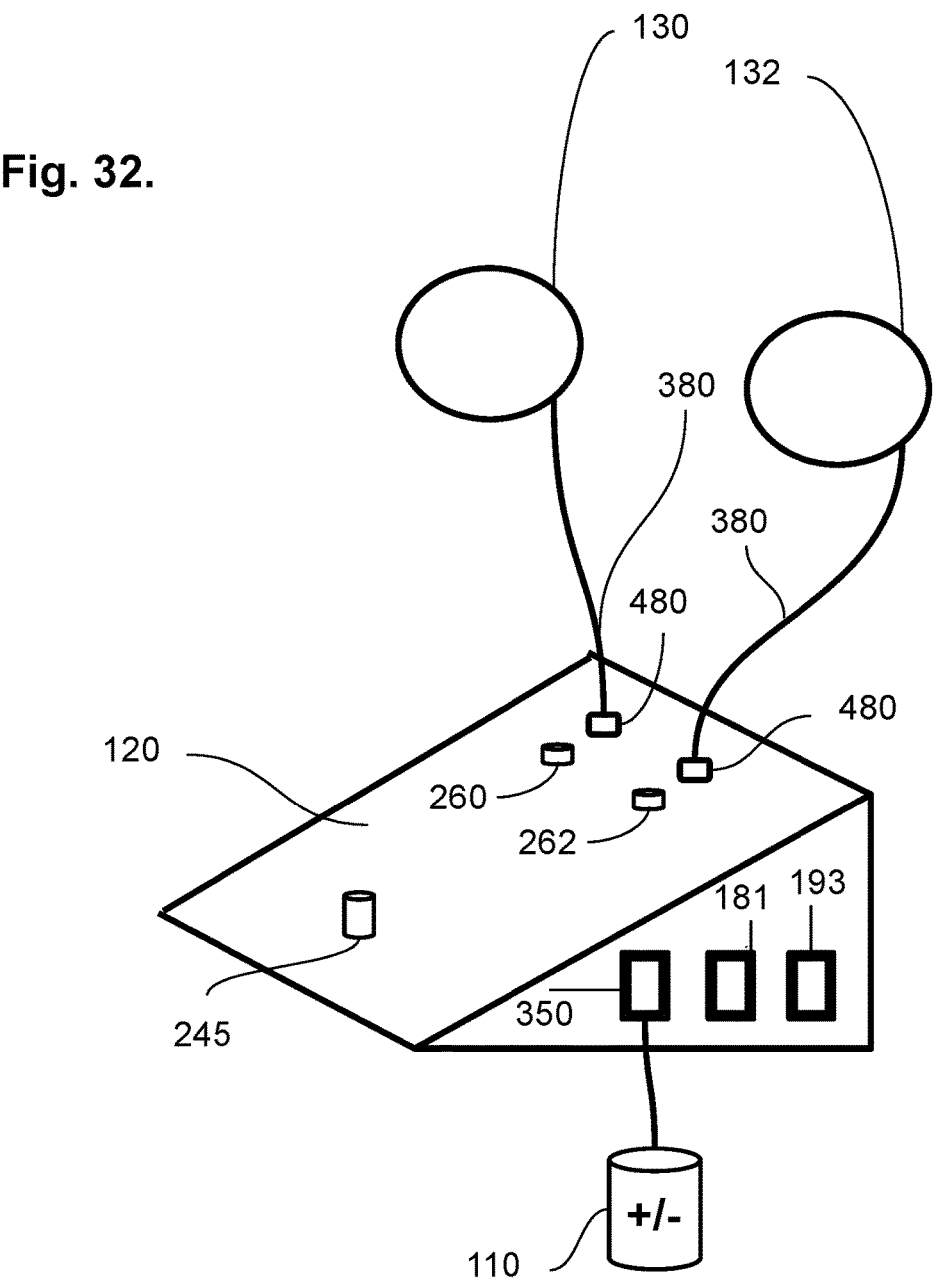
FIG. 32 shows a perspective view of various aspects of an eighth example of a touchless knob in accordance with the disclosure.
Figure 33:
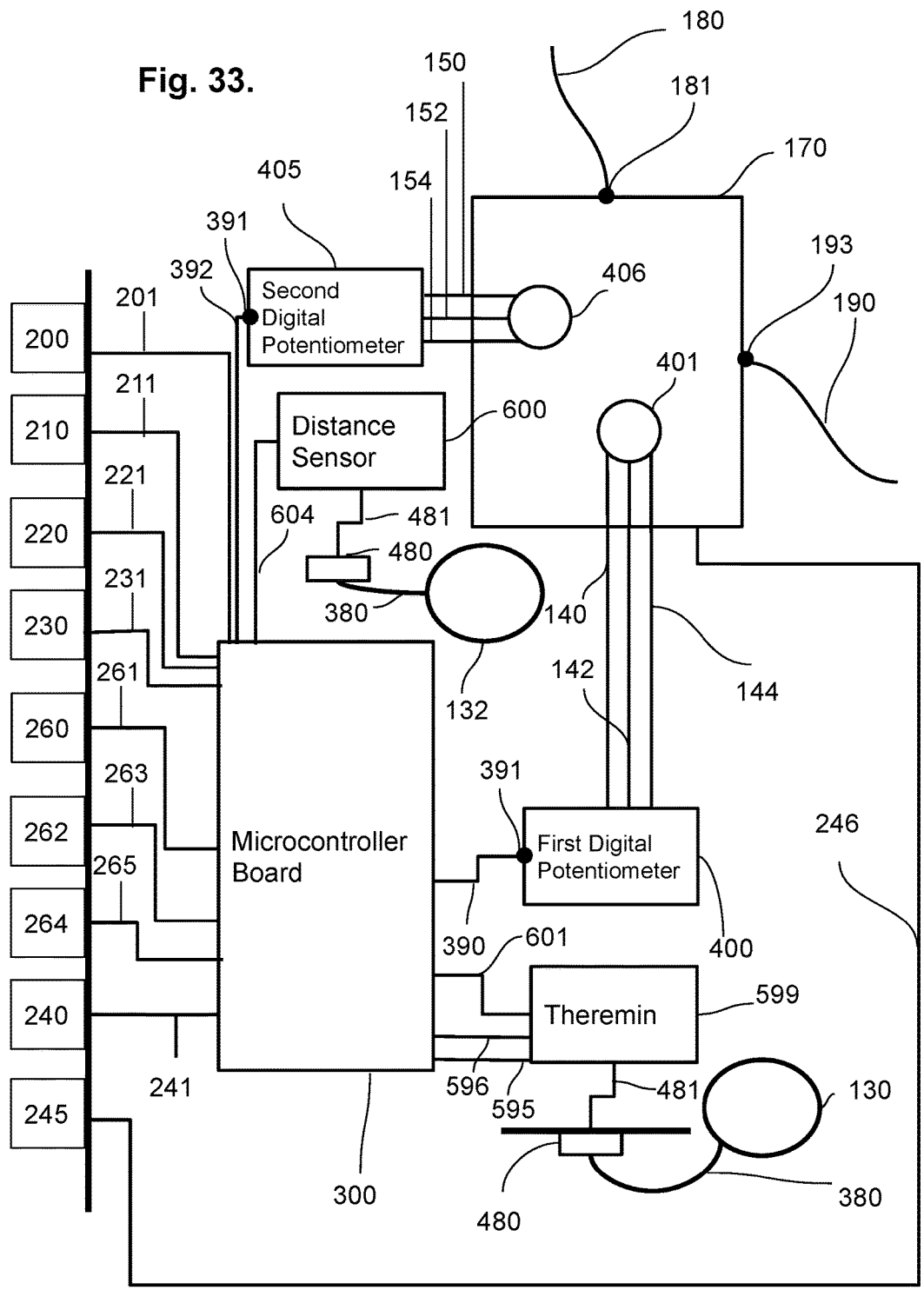
FIG. 33 shows a diagram of various aspects of the touchless knob shown in FIG. 32 in accordance with the disclosure.

FIG. 30 shows a perspective view of a seventh example of a touchless knob which is incorporated into an enclosure 120. FIG. 31 shows a diagram of the seventh example of a touchless knob. In the example depicted here, the audio-visual signal processing circuit is a wah-wah circuit 170. The wah-wah effect is well described in the document "The Technology of Wah Pedals" by R. G. Keen https://web.archive.org/web/20170406034444/http://www.geofex.com/article_folders/wahpedl/wahped.htm which is incorporated by reference.

The wah-wah circuit 170 has a first parameter 401 which is a resistor that sets the resonant peak of the wah-wah effect. This resistor is traditionally presented as a foot operated potentiometer, and is denoted Rw in the "What Affects What" diagram in "The Technology of Wah Pedals". This foot operated potentiometer is replaced with a programmatically controlled component which is a digital potentiometer 400.

The wah-wah circuit 170 has a second parameter 406 which is a capacitor that sets the center of the frequency range of the wah effect through which the resonant peak can sweep. This capacitor is denoted as Cf in the "What Affects What" diagram in "The Technology of Wah Pedals". This capacitor Cf is replaced with a second programmatically controlled component which is a varactor 405. With the varactor 405 there are only two legs to connect to the circuit traces of the second parameter 406, a second low leg 150, and a second high leg 154.

The microcontroller board 300 outputs a second control signal 392 to the second control signal input 393 of the varactor 405, affecting the capacitance of the varactor 405 and therefore changing the second parameter 406 from a current parameter value to a modified parameter value. The modified parameter value in turn affects the performance of the wah-wah circuit 170. This second control signal 392 would resemble the capacitive control signal 596 described above.

This example shows the advantages of exploiting varactors as programmatically controlled components within audio-visual signal processing circuits.

FIGS. 32, 33—DESCRIPTION OF EIGHTH EXAMPLE

In this example, the second touchless sensor is a distance sensor 600. The second touchless sensor output signal is a distance sensor output 604. This embodiment may be advantageous by providing two touchless sensors that by nature of their differences can be operated in close proximity with negligible interference. This allows the touchless knob signal processing system to comfortably accomplish control of two discrete parameters of the audio-visual signal processing circuit 170 simultaneously.

Thus the reader will see that the disclosed touchless knobs provide signal processing systems that allow performers to keep both hands on their instruments as they adjust at least one parameter of an audio-visual signal processing circuit.

The disclosed embodiments that incorporate expressive human body motion will strongly resonate with an artistic community. Having the ability to manipulate a signal processing circuit without touching it has significant advantages, particularly for live performance applications, where the performer need not forfeit a useful hand from their instrument in order to manipulate a parameter of the signal processing circuit.

While my above description contains many specificities, these should not be construed as limitations on the scope, but rather as an exemplification of one [or several] embodiments thereof. Many other variations are possible.

Accordingly, the scope should be determined not by the embodiments illustrated, but by the appended claims and their legal equivalents

DRAWINGS—REFERENCE NUMERALS

110 primary power supply
120 enclosure
130 antenna
131 minimum antenna
132 second antenna
140 first low leg
142 first wiper leg
144 first high leg
150 second low leg
152 second wiper leg
154 second high leg
160 third low leg
162 third wiper leg
164 third high leg
170 audio-visual signal processing circuit
180 unprocessed input signal
181 input signal connection
190 processed output signal
193 output signal connection
200 first input controller
201 first input controller signal output
210 second input controller
211 second input controller signal output
220 third input controller
221 third input controller signal output
230 fourth input controller
231 fourth input controller signal output
240 switch
241 switch signal output
245 bypass switch
246 bypass switch signal output
251 communication connection
260 first parameter input
261 first parameter input internal connection
262 second parameter input
263 second parameter input internal connection
264 third parameter input
265 third parameter input internal connection
300 microcontroller board
300*a* processor
300*b* non-transient storage medium
300*c* transmitting/receiving port
302 user interface
350 primary power supply input connection
380 adjustable wired antenna stand
390 control signal
391 control signal input
392 second control signal
393 second control signal input
394 third control signal
395 third control signal input
400 programmatically controlled component
401 first parameter
405 second programmatically controlled component
406 second parameter
410 third programmatically controlled component
411 third parameter
480 antenna enclosure connection
481 internal antenna connection
590 human
591 audio-visual input device
592 audio-visual output device
594 potentiometer
595 resistive control signal
596 capacitive control signal
597 varactor diode
598 digital potentiometer
599 touchless sensor
600 second touchless sensor
601 touchless sensor output signal
604 second touchless sensor output signal

I claim:

1. An audio effects signal processing system, comprising:
a) an audio effects signal processing circuit for receiving an unprocessed input signal and modifying the unprocessed input signal into a processed output signal as a function of at least one parameter of the audio effects signal processing circuit; and
b) at least one touchless sensor emitting at least one touchless sensor output signal in response to the proximity of an object to the at least one touchless sensor; and
c) a processor for controlling the at least one parameter of the audio effects signal processing circuit as a function of the at least one touchless sensor output signal and one or more control algorithms comprising one or more function transformations.

2. The audio effects signal processing system of claim 1, wherein the system includes an input for selecting or modifying the one or more function transformations.

3. The audio effects signal processing system of claim 1 wherein the processor includes one or more preset parameters and wherein the system includes an input for selecting or modifying the one or more preset parameters.

4. The audio effects signal processing system of claim 1 wherein the system includes one or more information outputs and wherein the system includes an input for selecting or modifying the one or more information outputs.

5. The audio effects signal processing system of claim 1 wherein the at least one touchless sensor includes a Theremin.

6. The audio effects signal processing system of claim 1 wherein the at least one touchless sensor includes a distance sensor.

7. The audio effects signal processing system of claim 1 wherein the at least one touchless sensor includes a capacitive sensor.

8. A machine for controlling at least one parameter of an audio effects signal processing circuit, the machine comprising:
   a) at least one touchless sensor emitting at least one touchless sensor output signal in response to the proximity of an object to the at least one touchless sensor; and
   b) a processor for controlling the at least one parameter of the audio effects signal processing circuit as a function of the at least one touchless sensor output signal and one or more control algorithms comprising one or more function transformations.

9. The machine of claim 8 wherein the machine includes an input for selecting or modifying the one or more function transformations.

10. The machine of claim 8 wherein the processor includes one or more preset parameters and wherein the machine includes an input for selecting or modifying the one or more preset parameters.

11. The machine of claim 8 wherein the machine includes one or more information outputs and wherein the machine includes an input for selecting or modifying the one or more information outputs.

12. The machine of claim 8 wherein the at least one touchless sensor includes a Theremin.

13. The machine of claim 8 wherein the at least one touchless sensor includes a distance sensor.

14. The machine of claim 8 wherein the at least one touchless sensor includes a capacitive sensor.

15. A method for controlling an audio effects signal processing circuit, the method comprising:
   a) receiving at least one touchless sensor output signal from at least one touchless sensor; and
   b) selecting or modifying one or more function transformations; and
   c) computing at least one modified parameter value for at least one audio effects signal processing circuit parameter as a function of the at least one touchless sensor output signal and one or more control algorithms comprising the one or more function transformations; and
   d) modifying the at least one audio effects signal processing circuit parameter to the at least one modified parameter value.

16. The method of claim 15 wherein the at least one touchless sensor includes a Theremin.

17. The method of claim 15 wherein the at least one touchless sensor includes a distance sensor.

18. The method of claim 15 wherein the at least one touchless sensor includes a capacitive sensor.

\* \* \* \* \*